United States Patent [19]

Blades

[11] Patent Number: 5,706,448
[45] Date of Patent: *Jan. 6, 1998

[54] METHOD AND SYSTEM FOR MANIPULATING DATA THROUGH A GRAPHIC USER INTERFACE WITHIN A DATA PROCESSING SYSTEM

[75] Inventor: Jerry Allen Blades, Boulder, Colo.

[73] Assignee: International Business Machines Corporation, Armonk, N.Y.

[*] Notice: The term of this patent shall not extend beyond the expiration date of Pat. No. 5,524,196.

[21] Appl. No.: 366,278

[22] Filed: Dec. 29, 1994

Related U.S. Application Data

[63] Continuation-in-part of Ser. No. 992,891, Dec. 18, 1992, Pat. No. 5,524,196.

[51] Int. Cl.⁶ ............................................ G06F 17/00
[52] U.S. Cl. ............................................ 395/326; 395/352
[58] Field of Search ............................ 395/151–161, 395/137, 326, 334, 340, 348, 352, 353, 354; 340/727; 345/121, 123, 125, 120

[56] References Cited

U.S. PATENT DOCUMENTS

| | | | |
|---|---|---|---|
| 5,345,550 | 9/1994 | Bloomfield | 395/156 |
| 5,392,388 | 2/1995 | Gibson | 395/159 |
| 5,418,549 | 5/1995 | Anderson et al. | 345/145 |
| 5,450,540 | 9/1995 | Spohrer et al. | 395/155 |
| 5,452,413 | 9/1995 | Blades | 395/159 |
| 5,452,414 | 9/1995 | Rosendahl et al. | 395/159 |
| 5,463,726 | 10/1995 | Price | 395/155 |
| 5,463,727 | 10/1995 | Wiggins et al. | 395/156 |
| 5,524,196 | 6/1996 | Blades | 395/155 |

FOREIGN PATENT DOCUMENTS 498082  12/1992  European Pat. Off. .

OTHER PUBLICATIONS

"Apple Human Interface Guidelines", Addison–Wesley Publishing Company, 1987, pp. 42–48.

*Primary Examiner*—Mark K. Zimmerman
*Assistant Examiner*—Stephen Hong
*Attorney, Agent, or Firm*—Felsman, Bradley, Gunter & Dillon

[57] ABSTRACT

A method and system for efficiently managing a plurality of displayable objects within a display. The present invention displays a first plurality of graphic selections in a substantially circular formation. Each of the graphic selections are associated with one of the displayable objects. A rotatable pointer is displayed within the circular formation with the rotatable pointer including a movable control element located within the rotatable pointer. A second plurality of graphic selections are arranged in a substantially circular formation. The display of this second plurality of graphic selection may be altered in response to a selection of a graphic selection from the first plurality of graphic selections. A display of a displayable object associated with the selected graphic selection from the first plurality of graphic selections occurs utilizing the rotatable pointer and the removable control element.

17 Claims, 23 Drawing Sheets

METHOD AND SYSTEM FOR MANIPULATING DATA THROUGH A GRAPHIC USER INTERFACE WITHIN A DATA PROCESSING SYSTEM

CROSS REFERENCE TO RELATED APPLICATION

This application is a continuation in part of an application entitled "Method And System For Manipulating Data Through a Graphic User Interface Within A Data Processing System", Ser. No. 07/992,891, filing date Dec. 18, 1992, now U.S. Pat. No. 5,524,196.

Applicant incorporates said application Ser. No. 07/992,891 by reference herein and claims the benefit of said application for all purposes pursuant to 37 C.F.R. §1.78.

BACKGROUND OF THE INVENTION

1. Technical Field

The present invention relates in general to improved data processing systems and in particular, to improvements in manipulating data through a graphic user interface within a data processing system. Still more particularly, the present invention relates to improvements in manipulating multiple functions and windows through a graphic user interface within a data processing system.

2. Description of the Related Art

The manipulation of data in a data processing system is well known in the prior art. Data may be manipulated in many ways in a modern state-of-the-art data processing system including: data accessing, data encoding, data communications, data compression, data conversion, data entry, data exchange, data filing, data linking, data locking, data manipulation, data mapping, data modeling, data processing, data recording, data sorting, and data transferring. The large amounts of data that are available to the user of a modern state-of-the-art data processing system often become overwhelming in magnitude and complexity.

As a result of the increasing complexity of data processing systems, attempts have been made to simplify the interface between a user and the large amounts of data present within a modern data processing system. One example of an attempt to simplify the interface between a user and a data processing system is the utilization of a so-called graphic user interface (GUI) to provide an intuitive and graphical interface between the user and the data processing system. A GUI is an interface system, including devices, by which a user interacts with a system, system components, and/or system applications via windows or view ports, icons, menus, pointing devices, etc.

The term "mouse", as utilized hereinafter, refers to any type of operating system supported graphical pointing device including, but not limited to: a mouse; track ball; light pen; touch screen; or the like. A pointing device is typically employed by a user of a data processing system to interact with the data processing system's GUI. A "pointer" is an iconic image controlled by a mouse or other such devices which is displayed on the video display device of a data processing system to visually indicate to the user icons, menus, or the like that may be selected or manipulated.

One technique for presenting a list of objects settings or choices to a user, wherein multiple objects may be selected, is the utilization of the so-called "List Box". A List Box is typically utilized to display a list of settings, choices, or objects in which the number of setting, choices, or objects may vary. A List Box generally displays the settings, choices, or objects in an order that is meaningful to the user, such as alphabetic order, numeric order, chronological order, or some other order. For example, modern baud rates are often displayed in numeric order. Typically, such List Boxes are large enough to simultaneously display a plurality of choices, such as six or eight, and such boxes often include vertical or horizontal scroll bars, if the data is too large to be entirely visible within the List Box.

A "scroll bar" is a known user interface component that is associated with a scrollable area of a display, indicating to a user that more information is available and may be added in a particular direction with respect to the display. A scroll bar may be utilized to scroll additional data into view, and a scroll bar typically includes a slider and scroll buttons.

Another relatively recent advancement in the computer arts allows a user to simultaneously access, display, and manipulate data from a variety of related and/or unrelated computer application programs. This process is generally referred to as "multi-tasking". In a true multi-tasking system, several application programs are active simultaneously. Displays from each of these applications may be provided within a two-dimensional display system by presenting overlapping data collections in multiple layers in a simulated three-dimensional manner within a data processing system. Each of these layers presents data associated with a particular data collection and these layers typically overlap and may partially or completely obscure each other and the data therein.

Certain inherent problems, however, exist in such multi-tasking systems. In order to reach data that the user desires to manipulate, the user must often follow a different and sometimes complicated procedure for each application program and, within each program, at each level of data type, such as file, page, or word, that the user attempts to access. Consequently, the user faces a loss of time because of the number of keystrokes necessary simply to obtain a visual image of a particular data collection in such an overlapping simulated three-dimensional display. In addition to the steps taken to reach data for manipulation, a multitude of functions may be performed upon the data depending on the type of data present and the application utilized.

Thus, those skilled in the data processing art will appreciate that while simple lists of objects or settings choices or overlapping windows may be displayed in a GUI, the types of data which are displayable within such a scrollable list are typically limited to a simple column of possible choices or objects and, in more complex data collections such as those which may be displayed within a window, the techniques necessary to visually access that data are often complex and time consuming. Additionally, a large number of functions may be performed upon such complex data collections adding to the complexity of manipulating data.

In the situation involving manipulation of multiple windows or applications and their related commands, problems exist with minimizing the amount of mouse movement required from a user. Current window environments typically require manipulation of each window and commands within the window. As a consequence, a user is required to bring the desired window to the foreground and then execute functions desired from within the selected window.

Therefore, it would be advantageous to have a method and system for manipulating displayed data collections within a data processing system in a manner minimizing the amount of user input required to manipulate displayed data collections.

SUMMARY OF THE INVENTION

It is therefore one object of the present invention to provide an improved data processing system.

It is another object of the present invention to provide an improved method and system for in manipulating data through a graphic user interface within a data processing system.

It is yet another object of the present invention to provide an improved method and system for manipulating multiple functions and windows through a graphic user interface within a data processing system.

The present invention provides a method and system for efficiently managing a plurality of displayable objects within a display. The present invention displays a first plurality of graphic selections in a substantially circular formation. Each of the graphic selections are associated with one of the displayable objects. A rotatable pointer is displayed within the circular formation with the rotatable pointer including a movable control element located within the rotatable pointer. A second plurality of graphic selections are arranged in a substantially circular formation. The display of this second plurality of graphic selection may be altered in response to a selection of a graphic selection from the first plurality of graphic selections. A display of a displayable object associated with the selected graphic selection from the first plurality of graphic selections occurs utilizing the rotatable pointer and the removable control element.

The first and second plurality of graphic selections may be displayed as two rings, wherein one of the rings is displayed within the first ring. The graphic selections within the second ring are associated with various functions and commands associated with the graphic selection selected from the first ring in accordance with a preferred embodiment of the present invention.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
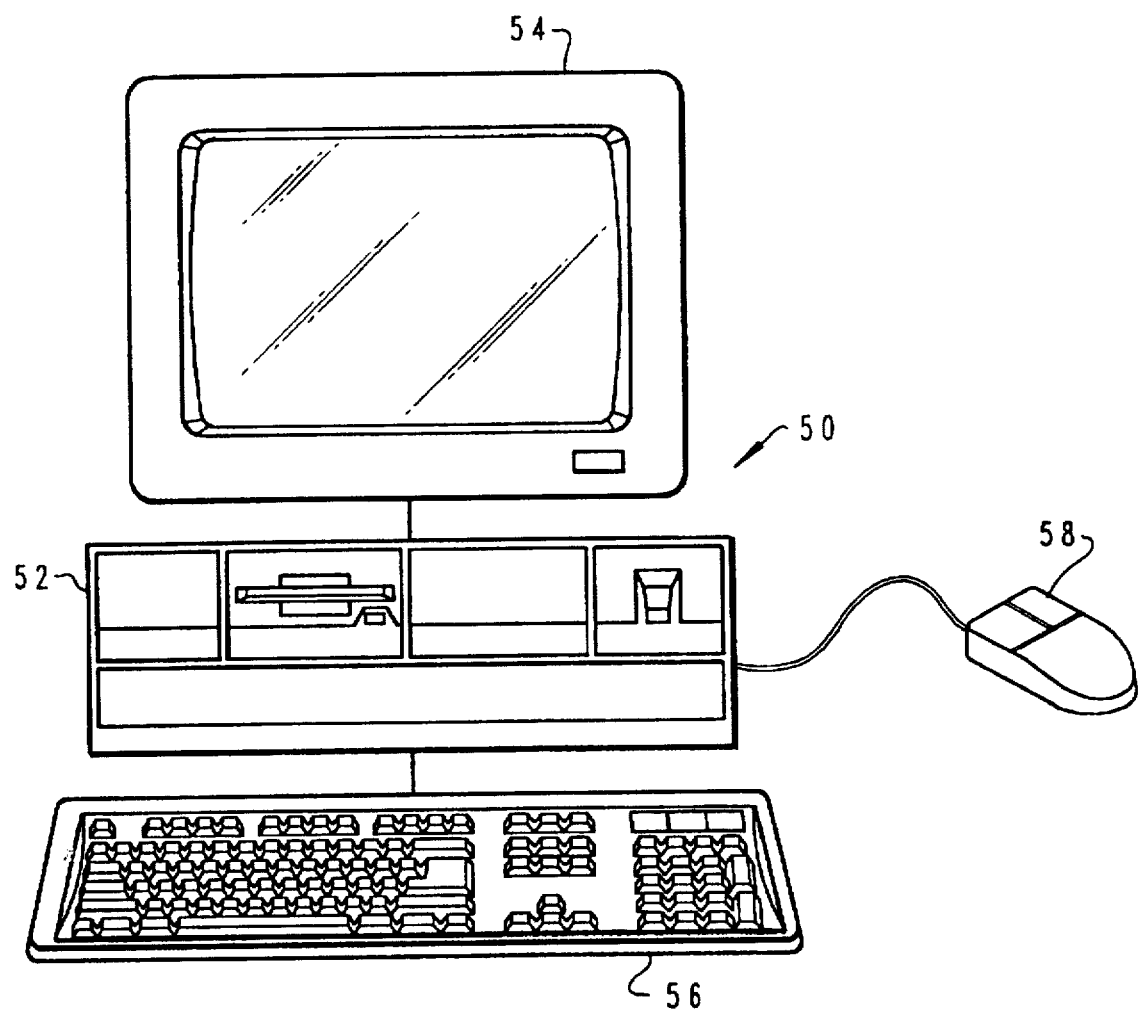
FIG. 1 is a pictorial representation of a personal computer that may be utilized to implement a method and system of the present invention.

With reference now to the figures and in particular with reference to FIG. 1, there is depicted a pictorial representation of a computer system in which the present invention may be implemented in accordance with a preferred embodiment of the present invention. A personal computer 50 is depicted which includes a system unit 52, a video display terminal 54, a keyboard 56, and a mouse 58. Personal computer 50 may be implemented utilizing any suitable computer such as an IBM PS/2 computer, a product of International Business Machines Corporation, located in Armonk, N.Y. "PS/2" is also a registered trademark of International Business Machines Corporation, located in Armonk, N.Y. Although the depicted embodiment involves a personal computer, a preferred embodiment of the present invention may be implemented in other types of data processing systems, such as for example, intelligent work stations or mini-computers.

Figure 2:
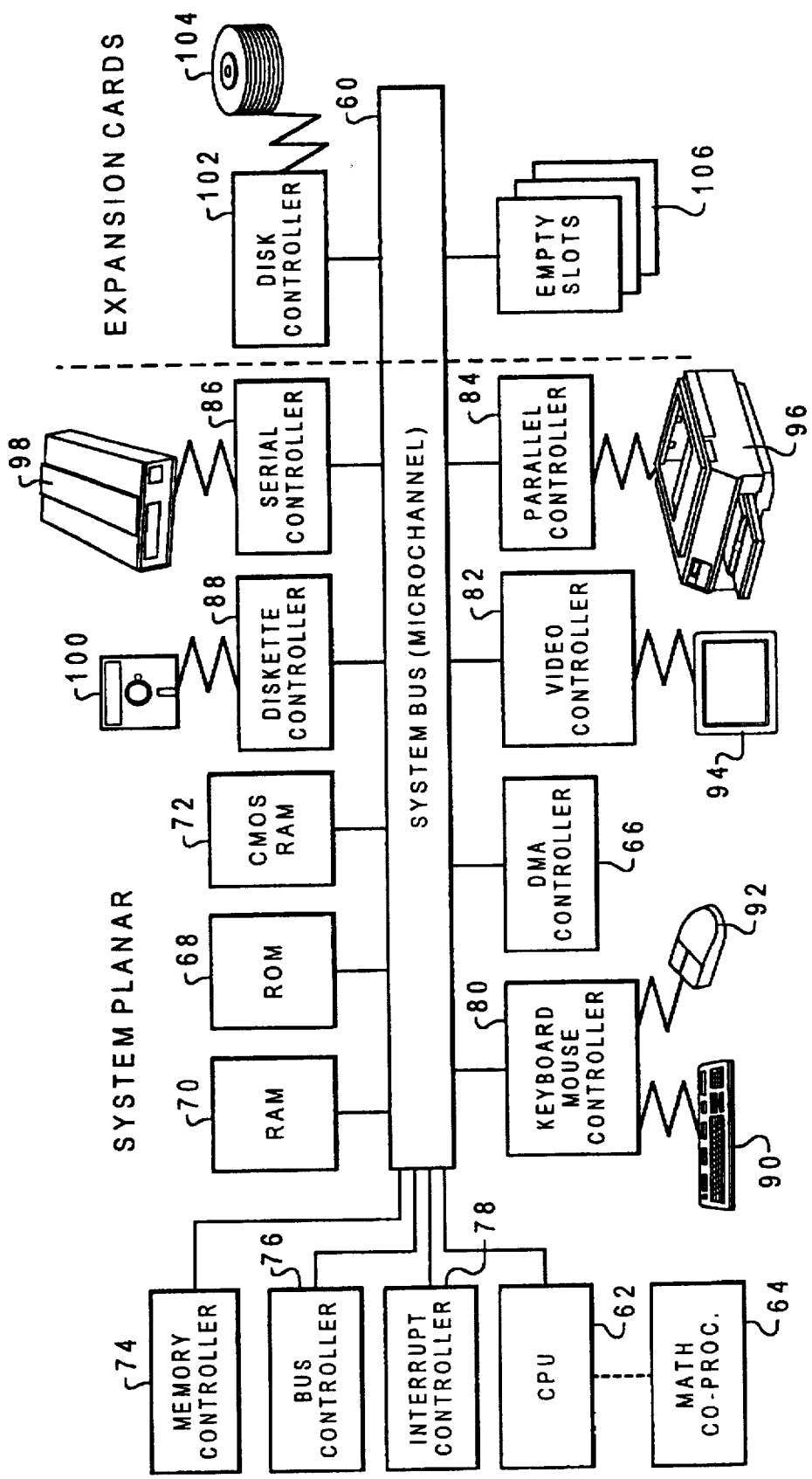
FIG. 2 depicts a block diagram of selected components in the personal computer illustrated in FIG. 2 in which a preferred embodiment of the present invention may be implemented.

Referring now to FIG. 2, there is depicted a block diagram of selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. System bus 50 may be a Micro Channel system bus from International Business Machines Corporation. "Micro Channel" is a registered trademark of International Business Machines Corporation. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. Read only memory (ROM) 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk drive, an audio adapter, high resolution graphics adapter, and the like also may be utilized in addition to or in place of the hardware already depicted to enable personal computer 50 to present multimedia presentations to a user.

Figure 3:
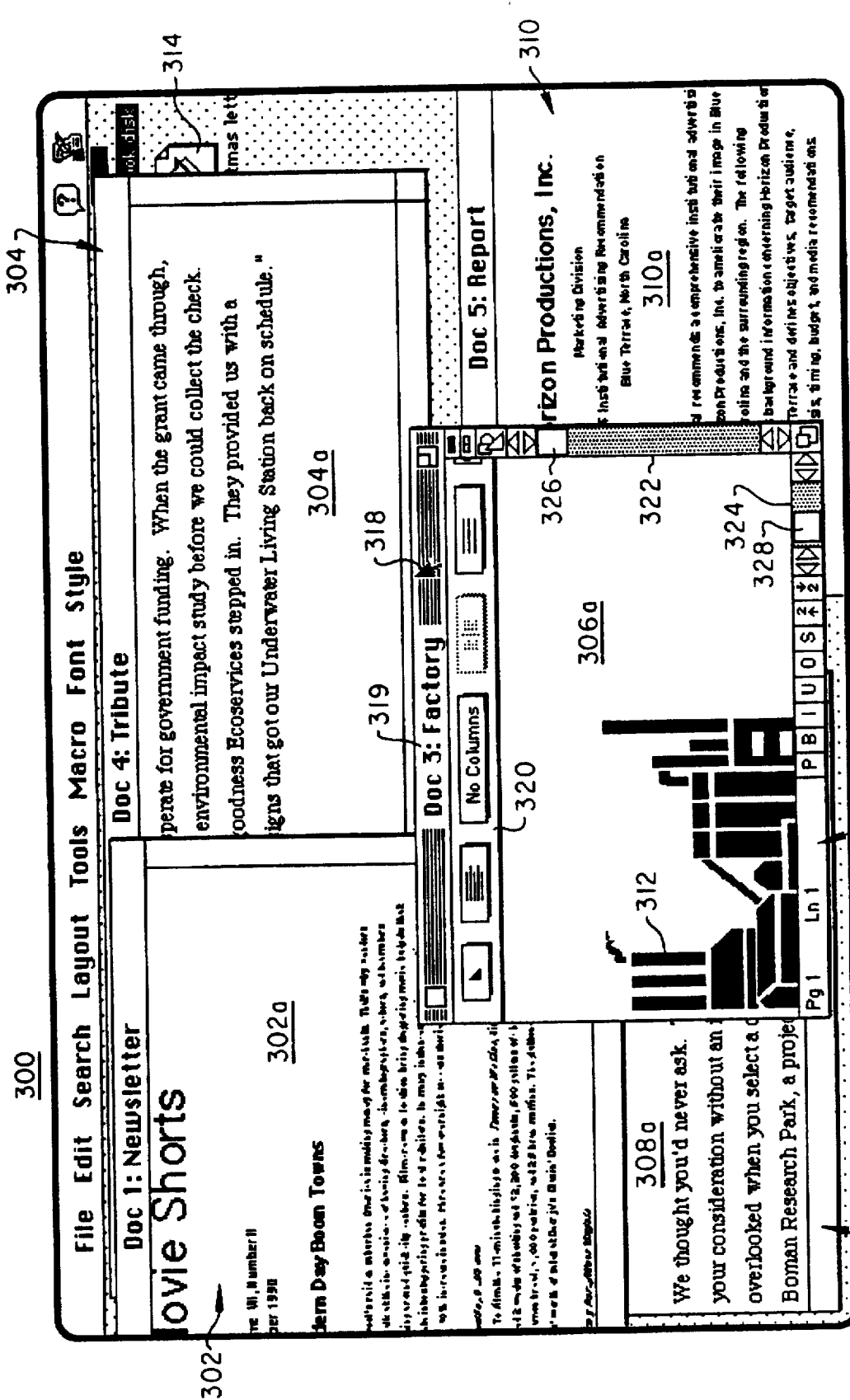
FIG. 3 depicts a pictorial representation of a display screen containing multiple windows arranged in a simulated three-dimensional manner displayed within a data processing system.

With reference now to FIG. 3, a pictorial representation illustrating a display screen containing multiple windows arranged in a simulated three-dimensional manner within a data processing system is depicted. Display screen 300 contains windows 302, 304, 306, 308, and 310. Each of these windows include display areas 302a, 304a, 306a, 308a, and 310a respectively. Icon 314 is a window in minimized form within display screen 300. Display screen 300 also includes command bar 316 for manipulating various functions and windows. Pointer 318 is a well known graphical representation utilized to indicate what windows, functions, or data may be manipulated by a user employing a mouse or some other pointing device.

Window 306 is depicted in the foreground of display screen 300 while the other windows are in a background mode. Display area 306a includes graphic image 312. Title bar 319 is provided within window 306 and utilized to present a title that may be utilized by the user to designate a particular data collection. Menu bar 320 is also provided. Those familiar with GUIs will appreciate that a command within menu bar 320 may be graphically selected utilizing pointer 318, or by depressing a particular key associated with a selected command. Scroll bar 322 and 324 are also associated with window 306. Slider 326 is located within scroll bar 322 while slider 328 is located within scroll bar 324. The sliders may be manipulated, resulting in manipulation of graphic image 312 within display area 306a. A preferred embodiment of the present invention, as described below, may be utilized to control various functions and windows within display screen 300.

Figure 4A:
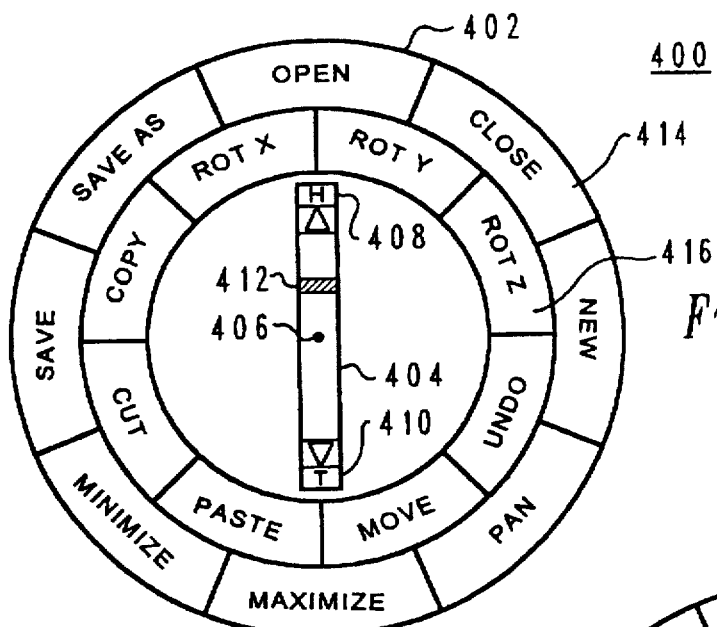
FIG. 4A is a pictorial representation of a circular control icon having a rotatable scroll bar for selecting functions located on two command rings.
Figure 4B:
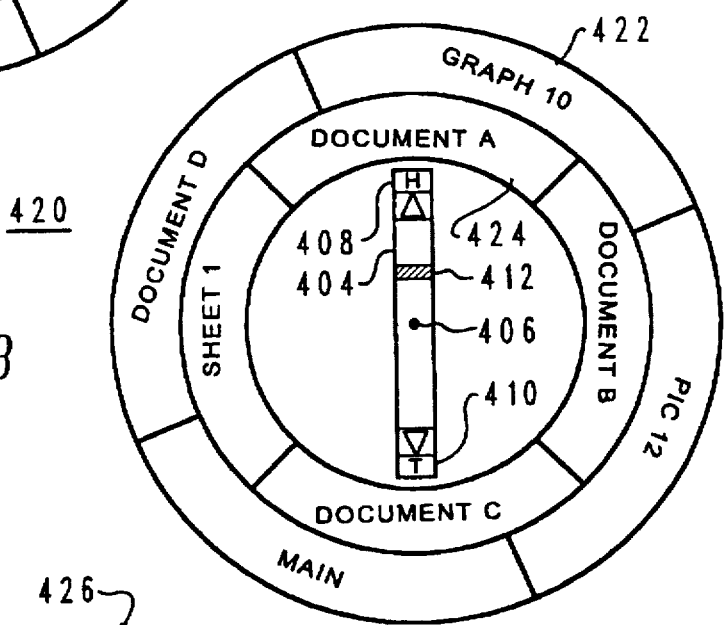
FIG. 4B is a pictorial representation of a circular control icon having a rotatable scroll bar for selecting widows utilizing two command rings.
Figure 4C:
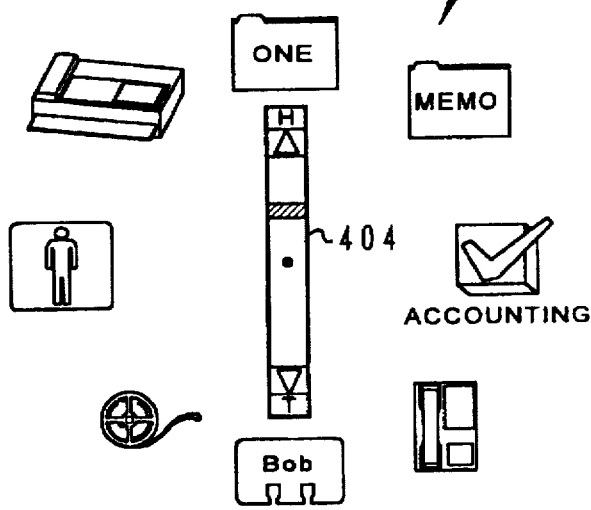
FIG. 4C is a pictorial representation of a circular control icon having a rotatable scroll bar for selecting functions and windows utilizing a single command ring.

Referring next to FIGS. 4A, 4B, and 4C, pictorial representations illustrating various configurations of a rotatable scroll bar located within one or more command rings in accordance with a preferred embodiment of the present invention are depicted. Referring first to FIG. 4A, circular control icon 400 is displayed. Circular control icon 400 includes peripheral section 402 and a rotatable scroll bar 404, within peripheral section 402. This control icon may be utilized to select various functions located in window 306 in accordance with one preferred embodiment of the present invention. Although peripheral section 402 is a circle in the depicted embodiment, it is contemplated that any substantially circular shape may be employed within a preferred embodiment of the present invention. "Substantially circular shape" as utilized herein shall mean any regular polygonal shape such as, for example, a hexagon or an octagon. Furthermore, a "substantially circular shape" may include a plurality of points, segments, or sections arranged in a regular polygonal shape. Points or sections along peripheral section 402 may correspond to or may map to a window in screen 300 in FIG. 3. Alternatively, points or sections along peripheral section 402 also may correspond to various functions utilized to manipulate data displayed on display screen 300 within a display device.

As illustrated, rotatable scroll bar 404 is located within peripheral section 402 and is rotatable about pivot point 406, which is centrally located within peripheral section 402. Rotatable scroll bar 404 preferably includes a scroll bar head 408 and a scroll bar tail 410. A moveable control element, slider 412, is located between head 408 and tail 410. Either scroll bar head 408 or scroll bar tail 410 may be selected by a user with a mouse to rotate rotatable scroll bar 404 about pivot point 406.

As depicted within FIG. 4A, peripheral section 402 contains two command rings, command ring 414 and command ring 416. These command rings include various functions that may be selected by a user manipulating rotatable scroll bar 404 with a mouse. In accordance with a preferred embodiment of the present invention, scroll bar head 408 is associated with command ring 416 and scroll bar tail 410 is associated with command ring 414. A function, such as, for example, "COPY", may be selected by a user when scroll bar tail 410 is selected and rotated such that scroll bar tail 410 points to the section or portion of command ring 416 labeled as COPY. Functions in command ring 414 may be chosen when a user selects scroll bar head 408 and rotates it to point to a desired function. Slider 412 is utilized to control the selected function in accordance with a preferred embodiment of the present invention.

Next, control icon 420 in FIG. 4B is an alternative embodiment of the control icon depicted in FIG. 4A. Again, two command rings 422 and 424 are depicted and may be selected utilizing head 408 or tail 410 within rotatable scroll bar 404, which is rotatable about pivot point 406. Pivot point 406 is centrally located within peripheral section 402. Command rings 422 and 424 permit various windows to be selected utilizing head 408 or tail 410 in accordance with a preferred embodiment of the present invention. Selection of a window brings the window to the foreground for viewing or manipulation by a user. Slider 412 may be associated with a slider within a scroll bar or some other control element within the window selected by a user. Consequently a user may move slider 412 to manipulate the function provided by the associated slider within the scroll bar located within the selected window. Alternatively, slider 412 may be associated with some other function in accordance with a preferred embodiment of the present invention.

Turning now to FIG. 4C, another embodiment of the present invention is illustrated. Peripheral section 426 contains only one command ring. In this particular embodiment, peripheral section 426 is still considered substantially circular even though it is not formed by a continuous section in accordance with a preferred embodiment of the present invention. Each of the depicted icons in peripheral section 426 may be selected utilizing either scroll bar head 408 or scroll bar tail 410 within rotatable scroll bar 404 in accordance with a preferred embodiment of the present invention.

Those skilled in the art will realize that a multitude of variations may be made in constructing a substantially circular control icon in accordance with a preferred embodiment of the present invention. For example, two rotatable pointers or scroll bars could be placed together to form a cross that is rotatable about a pivot point.

Figure 5A:
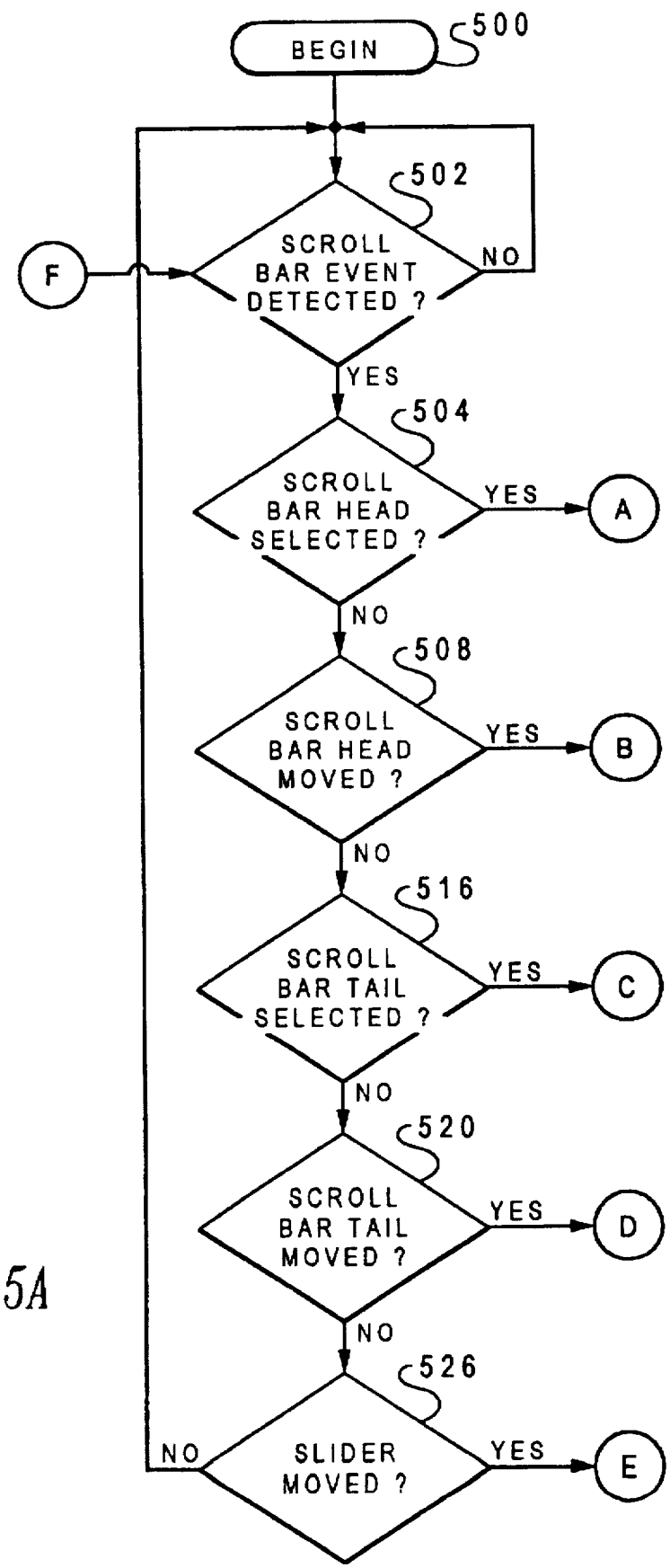
FIG. 5A depicts a portion of a high level logic flowchart illustrating a method and system for selecting multiple functions located on two command rings with a rotatable scroll bar located within the command rings in accordance with a preferred embodiment of the present invention.
Figure 5B:
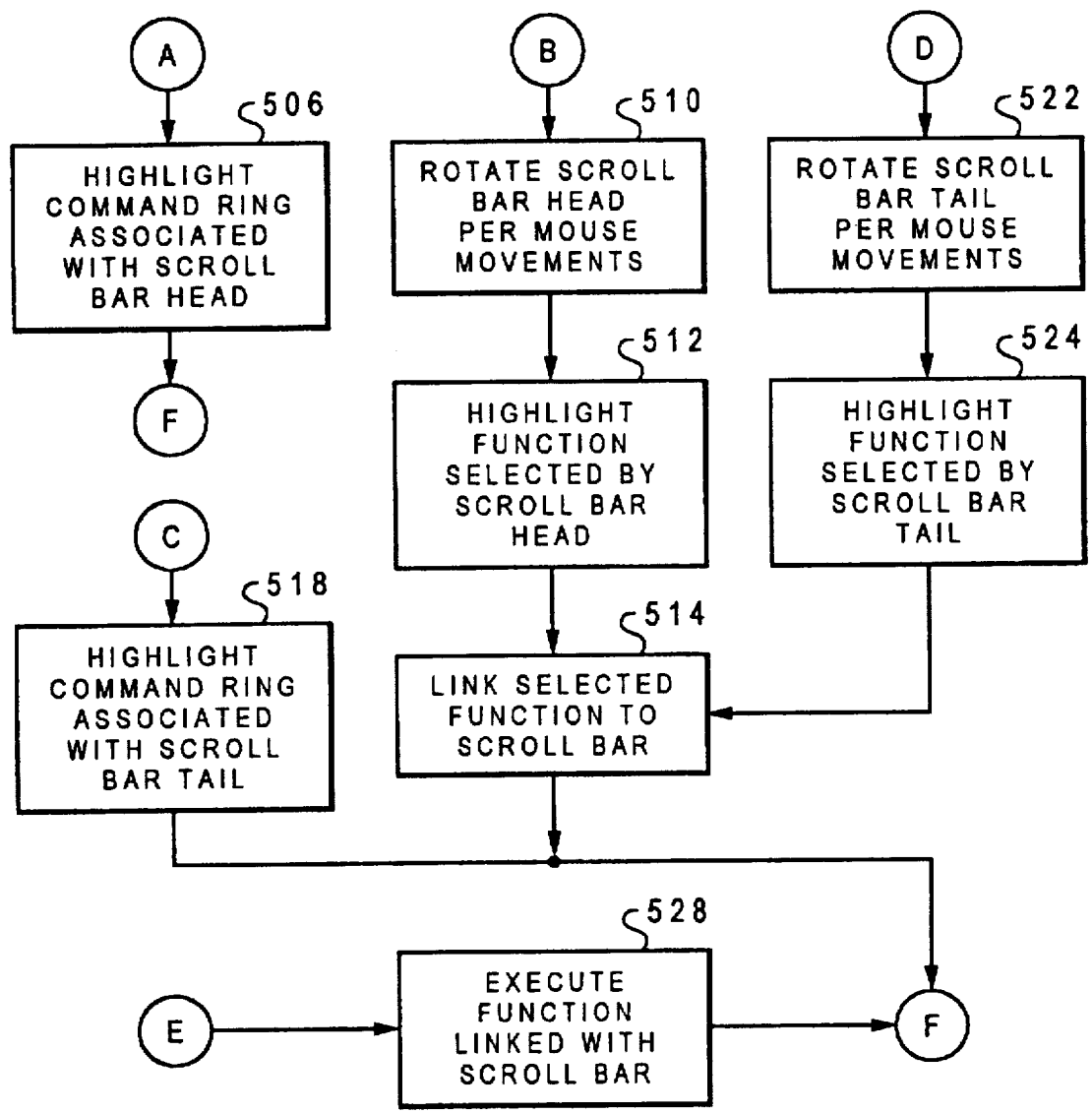
FIG. 5B depicts a portion of a high level logic flowchart illustrating a method and system for selecting multiple functions located on two command rings with a rotatable scroll bar located within the command rings in accordance with a preferred embodiment of the present invention.

With reference now to FIGS. 5A and 5B, a high level logic flowchart illustrating a method and system for selecting multiple functions located on two command rings with a rotatable scroll bar located within the command rings is depicted in accordance with a preferred embodiment of the present invention. The process begins in block 500 in FIG. 5A and thereafter passes to block 502. Block 502 depicts a determination of whether or not a scroll bar event has been detected. A scroll bar event may include various events such as a selection of the scroll bar tail or the scroll bar head, movement or rotation of the rotatable scroll bar, or movement of the slider.

After detecting a scroll bar event, the process then proceeds to block 504, which illustrates a determination of whether or not the scroll bar head has been selected. Upon a selection of the scroll bar head, the process proceeds to block 506 in FIG. 5B via connector A. Block 506 depicts the highlighting of a command ring associated with the scroll bar head. The command ring contains a number of selections representing various functions that may be selected by a user in accordance with a preferred embodiment of the present invention. Afterward, the process returns to block 502.

Referring back to block 504, if the scroll bar head has not been selected, the process passes to block 508, which depicts a determination of whether or not the scroll bar head has been moved. Movement of the scroll bar head is a scroll bar event that may occur only after the scroll bar head has been selected in accordance with a preferred embodiment of the present invention. If the scroll bar head has been moved, the process then passes to block 510 in FIG. 5B via connector B. Block 510 illustrates rotation of the entire scroll bar in accordance with the movements of the mouse. Afterward, the process advances to block 512, which depicts the highlighting of the function selected by the scroll bar head. Next, the process passes to block 514. Block 514 illustrates the linking of the selected function to the scroll bar. Thereafter, the process returns to block 502 in FIG. 5A via connector F to monitor for the occurrence of more scroll bar events.

Referring again to block 508, if the scroll bar event detected is not a movement of the scroll bar head, the process then proceeds to block 516, which illustrates a determination of whether or not the scroll bar tail has been selected. Selection of the scroll bar tail results in the process passing to block 518 in FIG. 5B via connector C. Block 518 depicts highlighting of a command ring associated with the scroll bar tail. The process then returns to block 502 in FIG. 5A via connector F.

Referring back to block 516, if the scroll bar event is not a selection of the scroll bar tail, the process then advances to block 520. Block 520 depicts the determination of whether or not the scroll bar event is a movement of the scroll bar tail. This particular scroll bar event may occur only after a scroll bar tail has been selected by the user. Movement of the scroll bar tail results in the process proceeding to block 522 in FIG. 5B via connector D. Block 522 illustrates the rotation of the entire scroll bar, including the scroll bar tail, in accordance with the movements of the mouse. Afterward, the process passes to block 524, which depicts the highlighting of functions selected by the scroll bar tail. Thereafter, the process proceeds to block 514. Block 514 illustrates the linking of the selected function to the scroll bar. The process then returns to block 502 in FIG. 5A via connector F.

Referring back to block 520, if the scroll bar event does not involve movement of the scroll bar tail, the process proceeds to block 526, which illustrates a determination of whether or not the scroll bar event involves movement of the slider. Movement of the slider results in the process proceeding to block 528 in FIG. 5B via connector E. Block 528 depicts the execution of the function currently linked with the scroll bar. Afterward, the process returns to block 502 in FIG. 5A via connector F. Referring back to block 526, if the scroll bar event does not include movement of the slider, the process simply returns to block 502 in accordance with a preferred embodiment of the present invention.

Figure 6A:
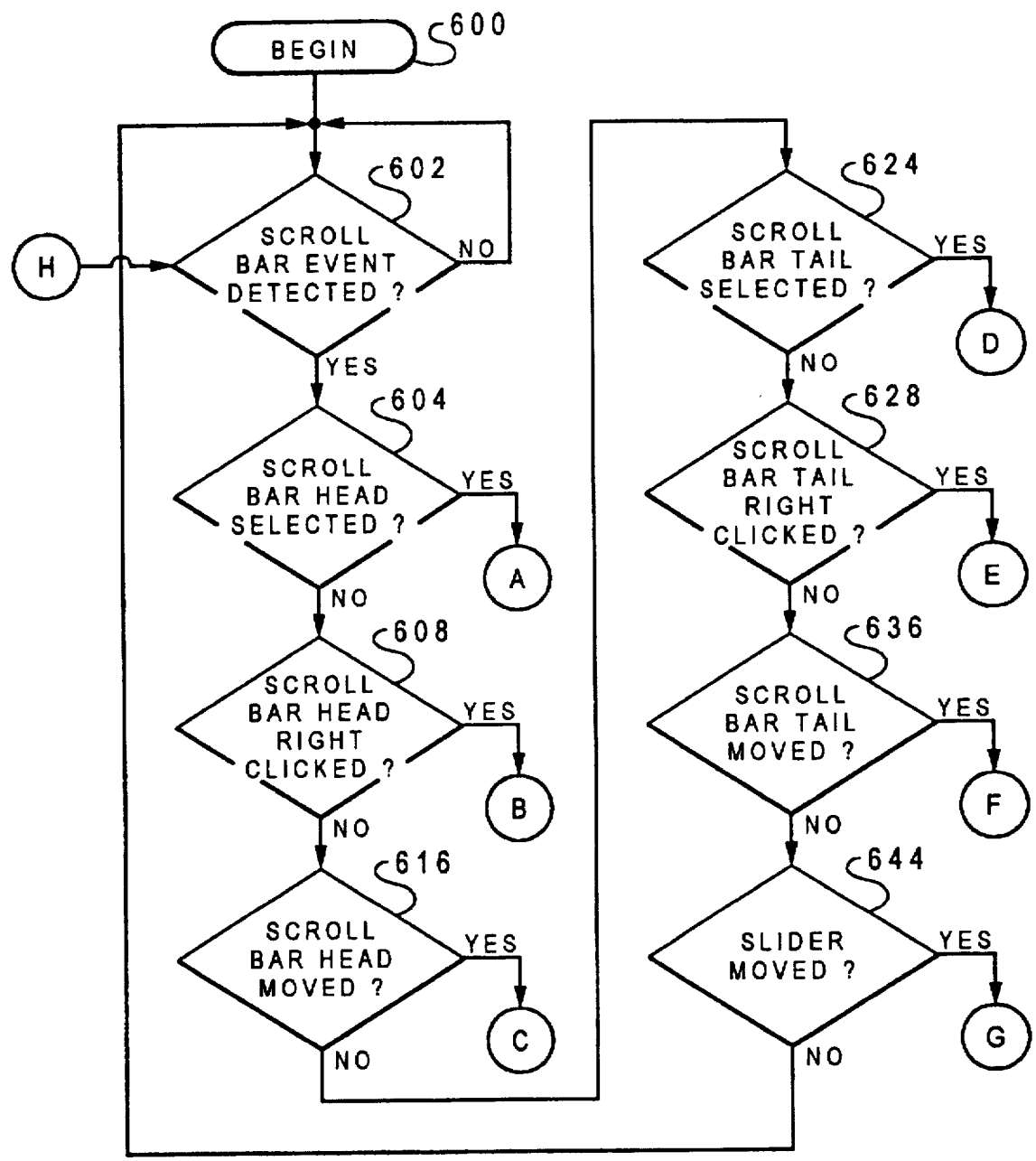
FIG. 6A is a portion of a high level logic flowchart illustrating a method and system for selecting multiple functions located on more than two command rings with a rotatable scroll bar in accordance with a preferred embodiment of the present invention.
Figure 6B:
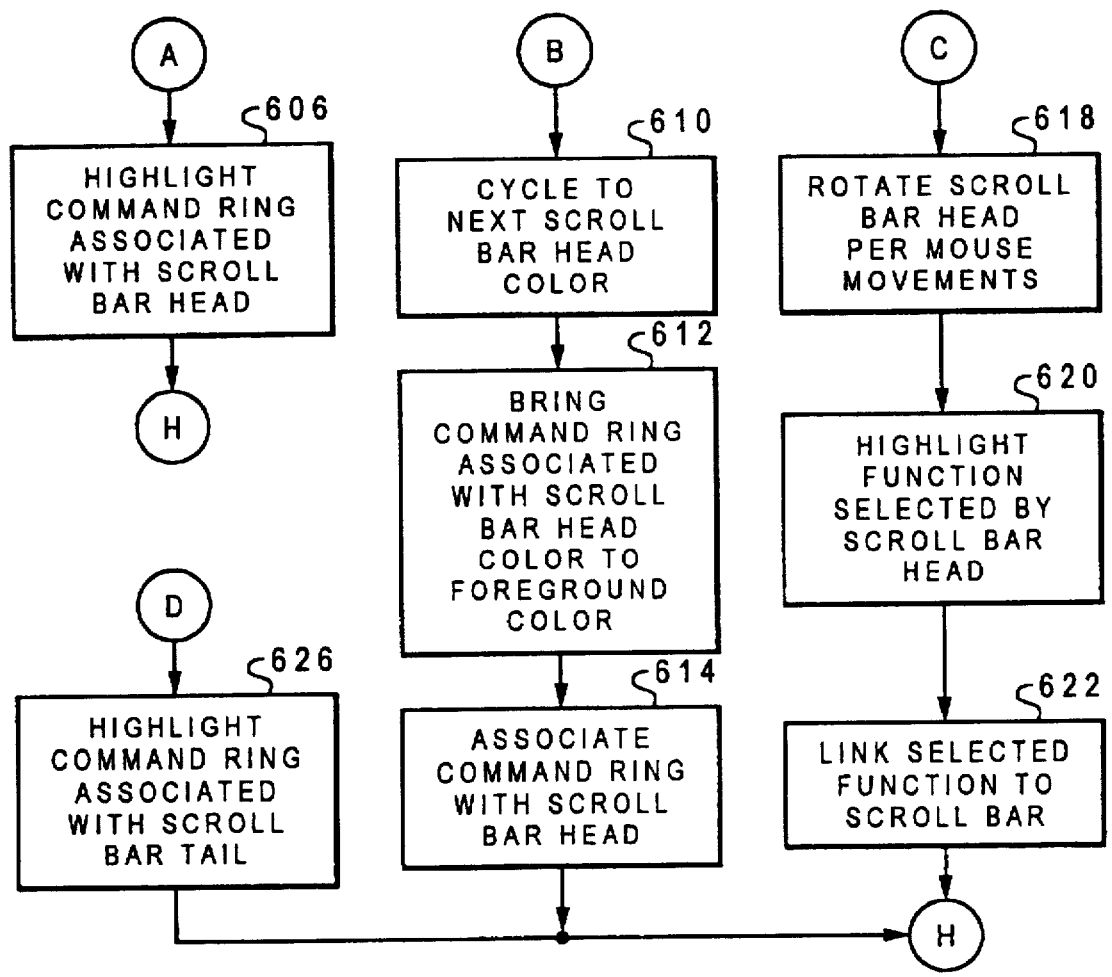
FIG. 6B is a portion of a high level logic flowchart illustrating a method and system for selecting multiple functions located on more than two command rings and a rotatable scroll bar in accordance with a preferred embodiment of the present invention.
Figure 6C:
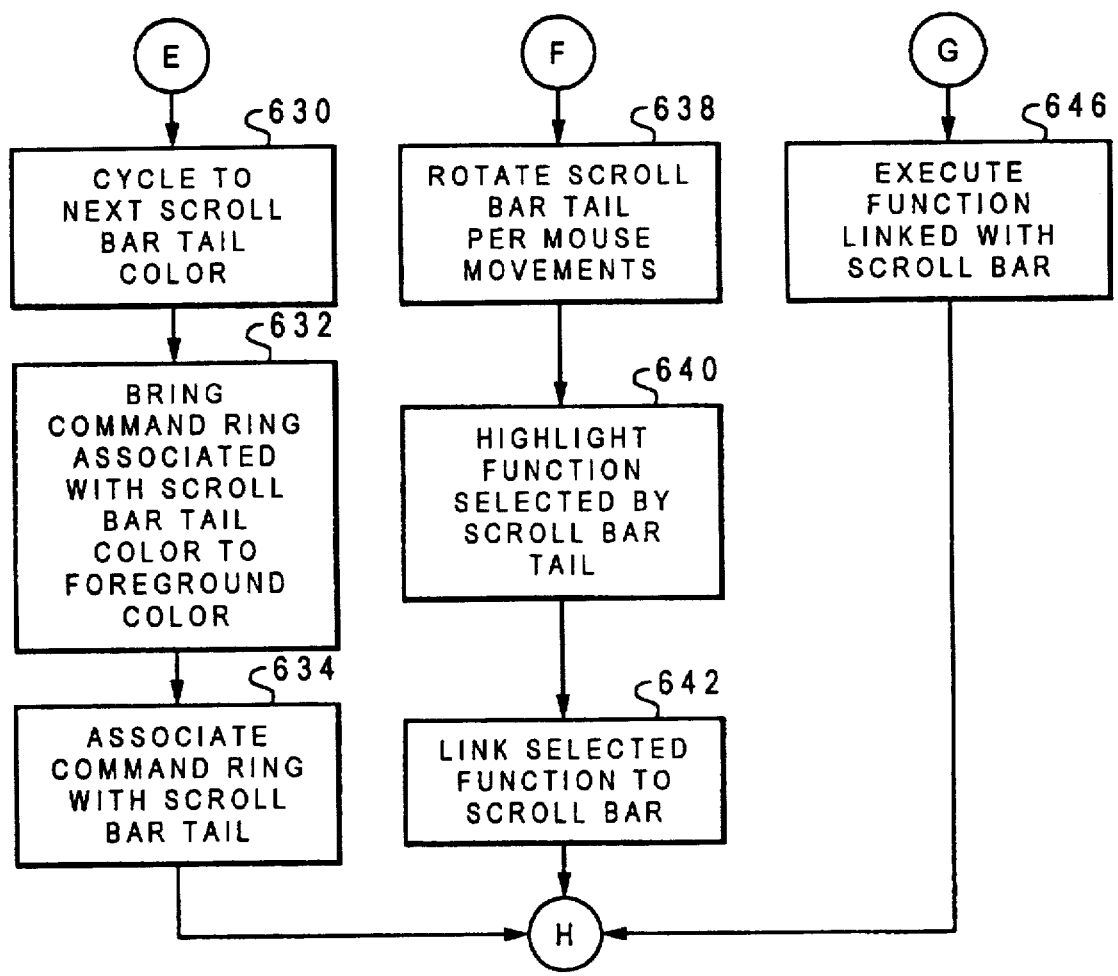
FIG. 6C is a portion of a high level logic flowchart illustrating a method and system for selecting multiple functions located on more than two command rings with a rotatable scroll bar in accordance with a preferred embodiment of the present invention.

Referring now to FIGS. 6A, 6B, and 6C, a high level logic flowchart illustrating a method and system for selecting multiple functions located on more than two command rings with a rotatable scroll bar in accordance with a preferred embodiment of the present invention is depicted. The process begins as illustrated in block 600 and thereafter proceeds to block 602, which depicts a determination of whether or not a scroll bar event has been detected. As mentioned above, a scroll bar event may involve various manipulations of the scroll bar such as selecting sections of the scroll bar or manipulating sections of the scroll bar.

In the event that a scroll bar event has been detected, the process passes to block 604. Block 604 illustrates a determination of whether or not the scroll bar head has been selected. In the event that the scroll bar head is a selection of the scroll bar head, the process passes to block 606 in FIG. 6B via connector A. Block 606 depicts the highlighting of the command ring currently associated with the scroll bar head. Thereafter, the process returns to block 602 via connector H.

Referring again to block 604, if the scroll bar event is not a selection of the scroll bar head, the process proceeds to block 608. Block 608 depicts the determination of whether or not the scroll bar head has been "right clicked". The scroll bar head may be "right clicked" by plating the mouse pointer over the scroll bar head and depressing the right mouse button. If the scroll bar head has been "right clicked", the process passes to block 610 in FIG. 6B via connector B. Block 610 illustrates cycling the color of the scroll bar head to the next scroll bar head color. Various command rings may be associated with the scroll bar head depending on the scroll bar head's color. These command rings are in a background mode until selected for association with the scroll bar head. Afterward, the process passes to block 612, which depicts the bringing of the command ring associated with the scroll bar head color to the foreground color. The process then proceeds to block 614. Block 614 illustrates the association of the command ring brought to foreground color with the scroll bar head. This command ring is the active command ring in which functions may be selected. Afterward, the process returns to block 602 via connector H.

Referring back to block 608, if the scroll bar event does not involve the selection of a new color for the scroll bar head by "right clicking" the scroll bar head, the process advances to block 616, which illustrates a determination of whether or not the scroll bar event detected is a movement of the scroll bar head. Movement of the scroll bar head results in the process advancing to block 618 in FIG. 6B via connector C. Block 618 depicts the rotation of the scroll bar head in accordance with movements of the mouse. The process then passes to block 620, which illustrates the highlighting of the function selected by the scroll bar head in response to rotation of the scroll bar head. Afterward, the process proceeds to block 622. Block 622 depicts the linking of the selected function to the scroll bar. Afterward, the process returns to block 602 in FIG. 6B via connector H.

Referring back to block 616, if the event is not a movement of the scroll bar head, the process then proceeds to block 624, which depicts a determination of whether or not the scroll bar event is a selection of the scroll bar tail. In the event, that the scroll bar tail is selected, the process proceeds to block 626 in FIG. 6B via connector B. Block 626 illustrates the highlighting of the command ring currently associated with the scroll bar tail. Thereafter, the process returns to block 602 in FIG. 6B via connector H.

Referring again to block 624, if the scroll bar event is an event other than the selection of the scroll bar tail, the process then proceeds to block 628, which illustrates a determination of whether or not the scroll bar tail has been "right clicked". If the scroll bar tail has been "right clicked", the process then proceeds to block 630 in FIG. 6C via connector E. Block 630 depicts cycling the color of the scroll bar tail to the next scroll bar tail color. Next, the process passes to block 632, which illustrates bringing the command ring associated with the scroll bar tail color to the foreground color. The process then advances to block 634, which depicts the association of the command ring brought to the foreground color with the scroll bar tail. Afterward, the process returns to block 602 in FIG. 6B via connector H.

Referring again to block 628, if the scroll bar event is an event other than the "right clicking" of the scroll bar tail, the process then proceeds to block 636, which depicts a determination of whether or not the scroll bar event involves movement of the scroll bar tail. Movement of the scroll bar tail results in the process passing to block 638 in FIG. 6C via connector F. Block 638 illustrates the rotation of the scroll bar tail in accordance with movements of the mouse. Afterward, the process proceeds to block 640, which depicts the highlighting of the function selected by the scroll bar tail. The process then advances to block 642. Block 642 illustrates the linking of the selected function to the scroll bar. Afterward, the process returns to block 602 in FIG. 6B via connector H.

Referring again to block 636, if the scroll bar event does not involve movement of the scroll bar tail, the process then advances to block 644, which illustrates a determination of whether or not the slider has been moved. Movement of the slider results in the process proceeding to block 646 in FIG. 6C via connector G. Block 646 depicts the execution of the function linked with the scroll bar. Afterward, the process returns to block 602 in FIG. 6B via connector H. Referring again to block 644, if the scroll bar event does not involve movement of the slider, the process then returns to block 602.

Figure 7D:
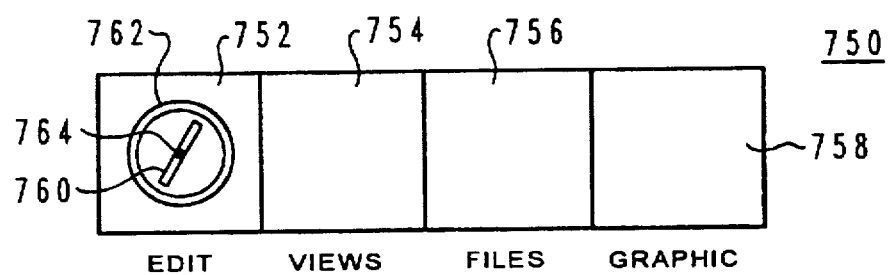
FIG. 7D depicts a pictorial representation of a grid containing various grid positions for command rings in accordance with a preferred embodiment of the present invention.
Figure 7A:
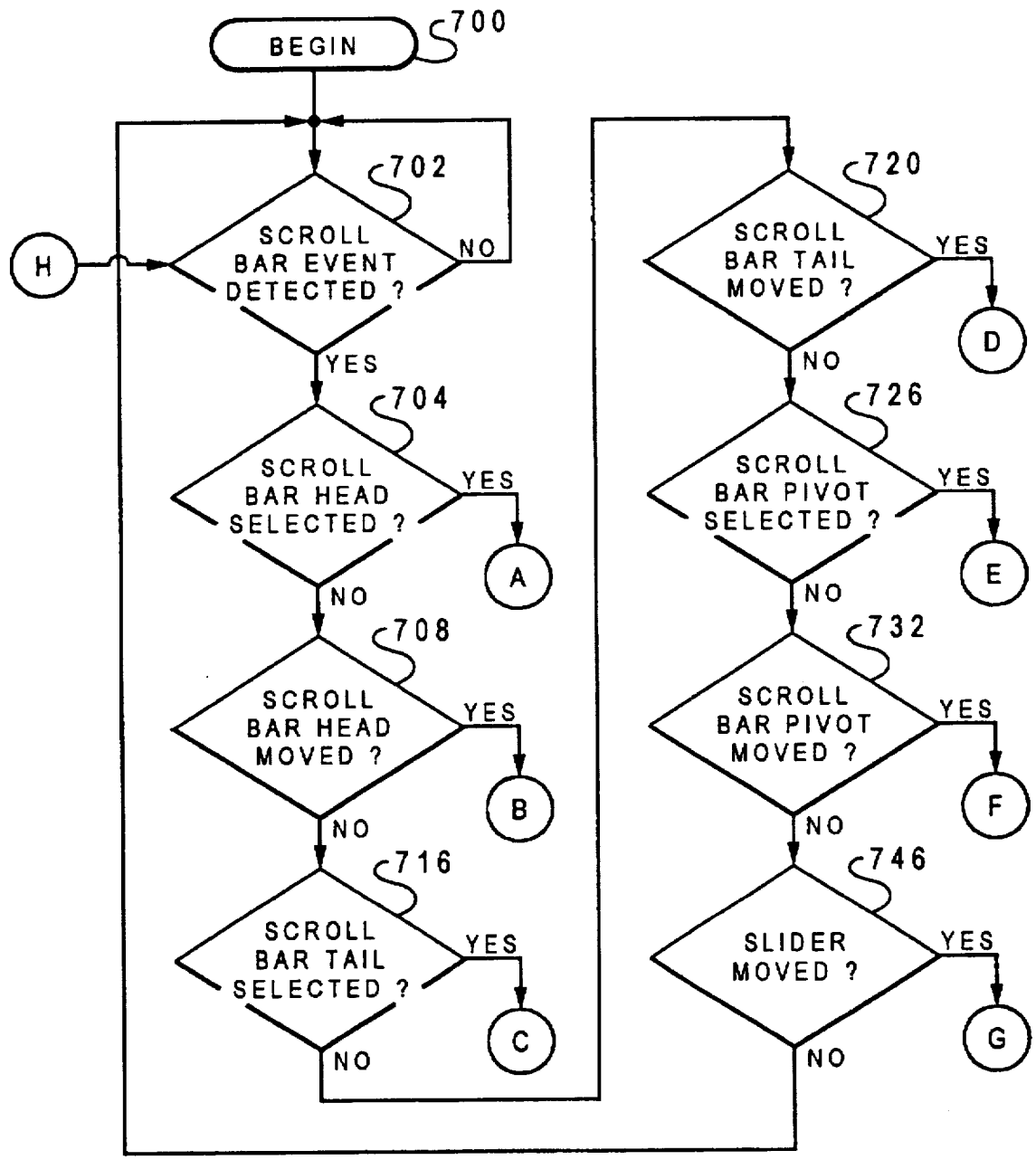
FIG. 7A depicts a portion of high level logic flowchart illustrating a method and system for selecting multiple functions with a control icon having a rotatable scroll bar that may be moved to a number of different command rings in accordance with a preferred embodiment of the present invention.
Figure 7B:
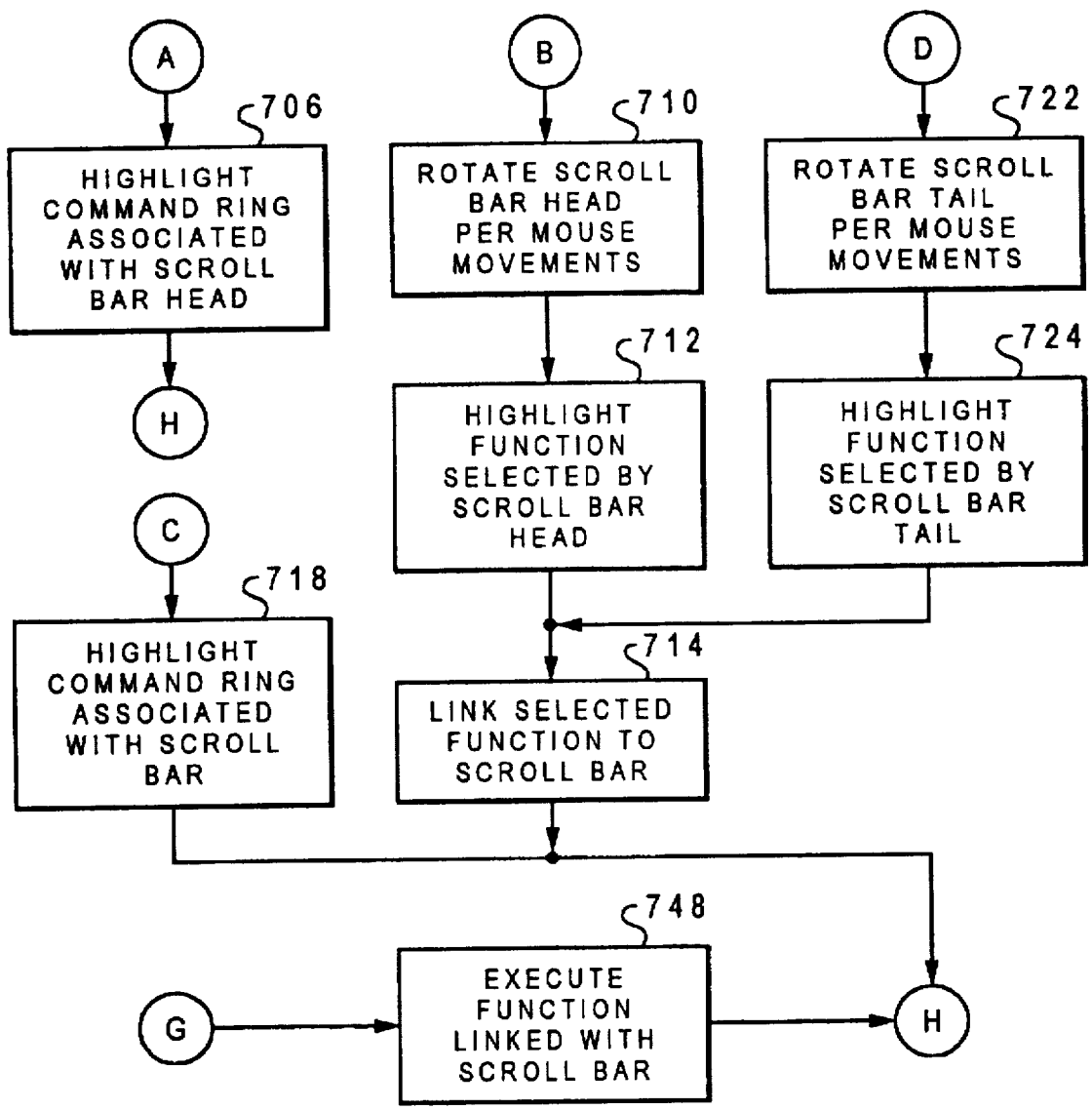
FIG. 7B depicts a portion of high level logic flowchart illustrating a method and system for selecting multiple functions with a control icon having a rotatable scroll bar that may be moved to a number of different command rings in accordance with a preferred embodiment of the present invention.
Figure 7C:
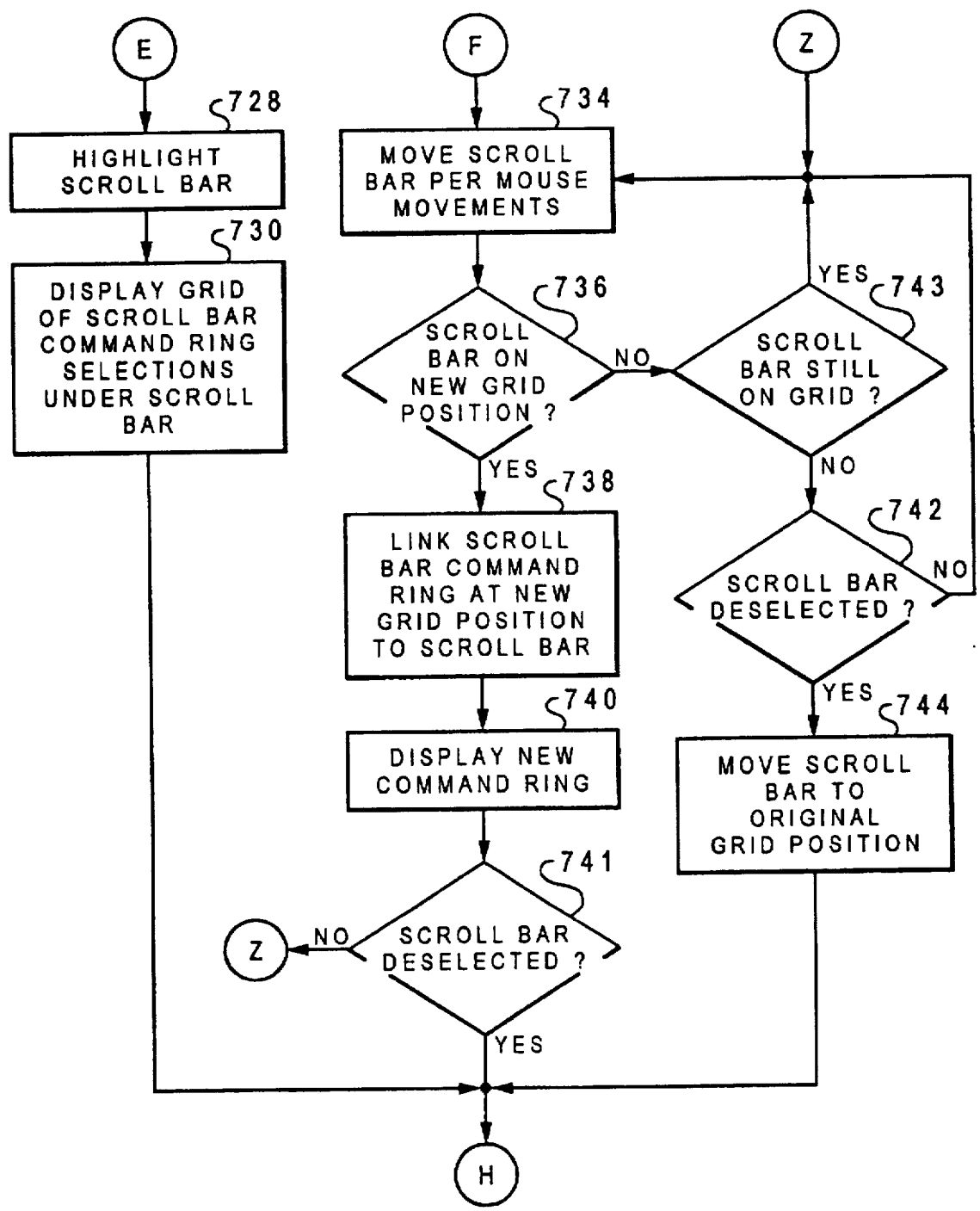
FIG. 7C depicts a portion of high level logic flowchart illustrating a method and system for selecting multiple functions with a control icon having a rotatable scroll bar that may be moved to a number of different command rings in accordance with a preferred embodiment of the present invention.

Referring now to FIGS. 7A, 7B, and 7C, a high level logic flowchart illustrating a method and system for selecting multiple functions with a control icon having a rotatable scroll bar that may be moved to a number of different command rings in accordance with a preferred embodiment of the present invention is depicted. FIG. 7D illustrates a pictorial representation of a grid containing various grid positions for command rings in accordance with a preferred embodiment of the present invention. Grid 750 includes four grid positions 752, 754, 756, and 758. Rotatable scroll bar 760 is located within command ring 762. Rotatable scroll bar pivot 764 may be moved from grid position 752 to any of the other three grid positions. Movement of rotatable scroll bar pivot 764 from grid position 752 to another grid position causes command ring 762 to become unlinked from rotatable scroll bar 760. Placing rotatable scroll bar pivot 764 in another grid position causes the command ring in the new grid position to be displayed, and rotatable scroll bar 760 becomes linked with the new command ring in accordance with a preferred embodiment of the present invention. As a result, functions within command rings may be placed in logical groupings. For example, grid position 752 may contain various editing functions while grid position 754 may contain functions for changing views or windows. Grid position 756 may be utilized for file management while grid position 756 may be utilized to perform graphic manipulations.

Referring now to FIG. 7A, the process begins in block 700 and thereafter proceeds to block 702. Block 702 depicts a determination of whether or not a scroll bar event has been detected. Upon detection of a scroll bar event, the process proceeds to block 704, which illustrates a determination of whether or not the scroll bar event is a selection of the scroll bar head. Selection of the scroll bar head results in the process passing to block 706 in FIG. 7B via connector A. Block 706 depicts the highlighting of the command ring associated with the scroll bar head. The process then returns to block 702 in FIG. 7A via connector H.

Referring back to block 704, if the scroll bar event is not a selection of the scroll bar head, the process then proceeds to block 708, which depicts a determination of whether or not the scroll bar event is a movement of the scroll bar head. Movement of the scroll bar head causes the process to advance to block 710 in FIG. 7B via connector B. Block 710 illustrates the rotation of the scroll bar head in accordance with the movements of the mouse. Afterward, the process proceeds to block 712, which depicts the highlighting of the function selected by the scroll bar head. The process next passes to block 714, which illustrates the linking of the selected function to the scroll bar. The process then returns to block 702 in FIG. 7A via connector H.

Referring back to block 708, if the scroll bar event is not movement of the scroll bar head, the process proceeds to block 716. Block 716 illustrates a determination of whether or not the scroll bar tail has been selected. Upon selection of the scroll bar tail, the process then proceeds to block 718 in FIG. 7B via connector C. Block 718 depicts the highlighting of the command ring associated with the scroll bar. Afterward, the process returns to block 702 in FIG. 7A via connector H.

Referring again to block 716, if the scroll bar event is not a selection of the scroll bar tail, the process then proceeds to block 720. Block 720 depicts a determination of whether or not the scroll bar tail has been moved. Movement of the scroll bar tail results in the process passing to block 722 in FIG. 7B via connector D. Block 722 illustrates the rotation of the scroll bar tail in accordance with mouse movements. Afterward, the process proceeds to block 724, which depicts the highlighting of the function selected by the scroll bar tail. Thereafter, the process advances to block 714, which illustrates the linking of the selected function with the scroll bar. Afterward, the process returns to block 702 in FIG. 7A via connector H.

Referring back to block 720, if the scroll bar event is not a movement of the scroll bar tail, the process then proceeds to block 726, which illustrates a determination of whether or not the scroll bar pivot has been selected. Selection of the scroll bar pivot causes the process to pass to block 728 in FIG. 7C via connector E. Block 728 depicts the highlighting of the scroll bar. Next, the process advances to block 730, which illustrates the display of a grid containing scroll bar command ring selections under the scroll bar in accordance with a preferred embodiment of the present invention. Afterward, the process returns to block 702 in FIG. 7A via connector H.

Referring back to block 726, if the scroll bar event was not a selection of the scroll bar pivot, the process proceeds to block 732. A determination of whether or not the scroll bar event is a movement of the scroll bar pivot is depicted in block 732. Movement of the scroll bar pivot may occur only after the scroll bar pivot has been selected by the user. A scroll bar event involving movement of the scroll bar pivot causes the process to pass to block 734 in FIG. 7C via connector F. Movement of the scroll bar pivots results in the entire scroll bar being moved in accordance with mouse movements as illustrated in Block 734.

Next, the process proceeds to block 736, which depicts a determination of whether or not the scroll bar is located on a new grid position. If the scroll bar is located on a new grid position, the process then proceeds to block 738, which illustrates the linking of a scroll bar command ring at the new grid position with the scroll bar. Next, the process proceeds to block 740, which depicts the displaying of the new command ring with the scroll bar. The process then passes to block 741. Block 741 illustrates a determination of whether or not the scroll bar has been deselected. If the scroll bar has been deselected, the process returns to block 702 in FIG. 7A via connector H. On the other hand, if the scroll bar has not been deselected the process returns to block 734 via connector Z.

Referring back to block 736, if the scroll bar has not been moved to a new grid position, the process then proceeds to block 743, which illustrates a determination of whether or not the scroll bar is still on the grid. If the scroll bar is still on the grid, the process then returns to block 734. When the scroll bar is off the grid, the process then proceeds to block 742, which illustrates a determination of whether or not the scroll bar has been deselected. If the scroll has not become deselected, the process returns to block 734. If, however, the scroll bar becomes deselected, the process proceeds to block 744, which depicts the moving of the scroll bar back to the original grid position in accordance with a preferred embodiment of the present invention. Those skilled in the art will realize that various events may occur other than returning the scroll bar back to the original grid upon deselection of the scroll bar. For example, the scroll bar may be moved to the nearest grid, instead of back to the original grid. Additionally, the scroll bar could be hidden and the mouse pointer may then be utilized for other functions. Afterward, the process returns to block 702 in FIG. 7A via connector H.

Referring back to block 732, if the scroll bar event is not a movement of the scroll bar pivot, the process then proceeds to block 746. Block 746 illustrates a determination of whether or not the slider on the scroll bar has been moved. Movement of the slider results in the process advancing to block 748 in FIG. 7B via connector G. Block 748 depicts the execution of the function linked with the scroll bar. Afterward, the process returns to block 702 in FIG. 7A via connector H. Referring back to block 646, if the scroll bar event is not a selection of the slider, the process then returns to block 702.

Figure 8A:
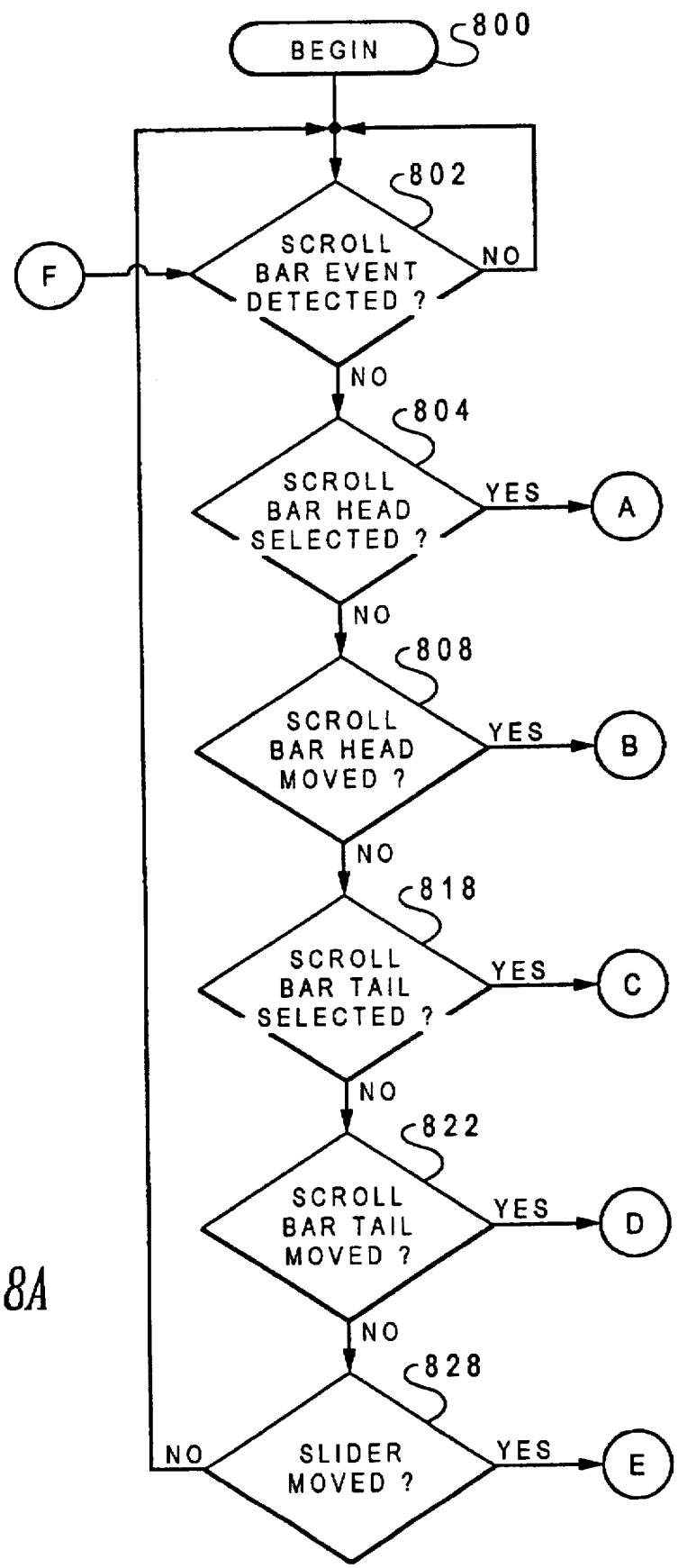
FIG. 8A is a portion of a high level logic flowchart illustrating a method and system for manipulating a number of windows utilizing a control icon having a rotatable scroll bar in accordance with a preferred embodiment of the present invention.
Figure 8B:
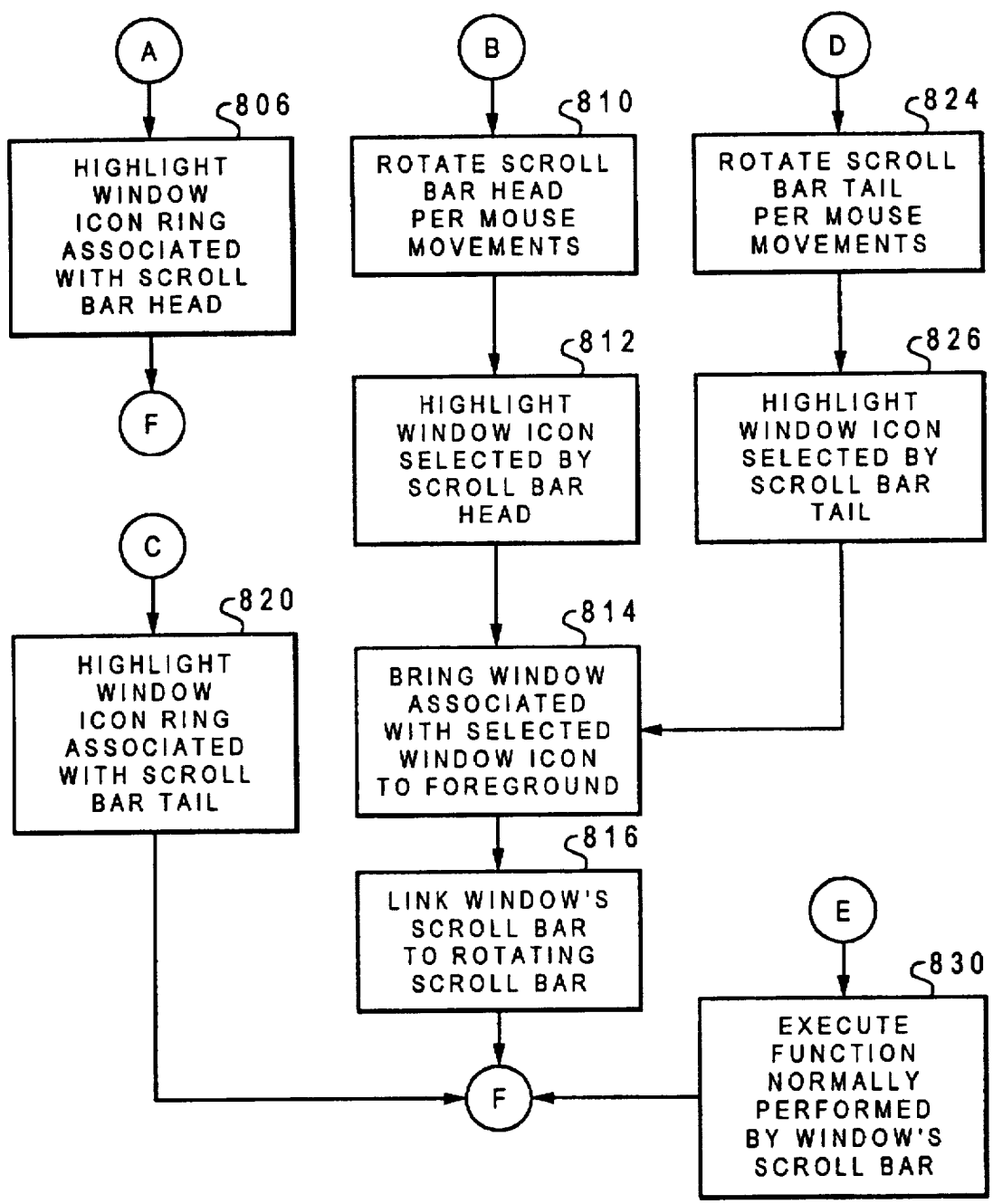
FIG. 8B is a portion of a high level logic flowchart illustrating a method and system for manipulating a number of windows utilizing a control icon having a rotatable scroll bar in accordance with a preferred embodiment of the present invention.

With reference now to FIGS. 8A and 8B, a high level logic flowchart illustrating a method and system for manipulating a number of windows utilizing control icon having a rotatable scroll bar in accordance with a preferred embodiment of the present invention is illustrated. The process begins in block 800, and thereafter proceeds to block 802, which depicts a determination of whether or not a scroll bar event has been detected. Upon detection of a scroll bar event, the process proceeds to block 804, which illustrates a determination of whether or not the scroll bar event involves a selection of the scroll bar head. Selection of the scroll bar head results in the process passing to block 806 in FIG. 8B via connector A. Block 806 depicts the highlighting of the window icon ring associated with the scroll bar head. Thereafter, the process returns to block 802 in FIG. 8A via connector F.

Referring back to block 804, if the scroll bar event is an event other than a selection of the scroll bar head, the process then advances to block 808. Block 808 depicts a determination of whether or not the scroll bar event consists of a movement of the scroll bar head. If the scroll bar event is a movement of the scroll bar head, the process then passes to block 810 in FIG. 8B via connector B. Block 810 illustrates the rotation of the scroll bar head in accordance with the movements of the mouse. Thereafter, the process proceeds to block 812, which depicts the highlighting of the window icon selected by the scroll bar head. Afterward, the process proceeds to block 814, which illustrates bringing the window associated with the selected window icon to the foreground. The process then passes to block 816. Block 816 depicts the linking of the window's scroll bar to the rotating scroll bar. Afterward, the process returns to block 802 in FIG. 8A via connector F.

Referring again to block 808, in the event that the scroll bar event is not a movement of the scroll bar head, the process then passes to block 818, which illustrates a determination of whether or not the scroll bar tail has been selected. A scroll bar event involving the selection of the scroll bar tail results in the process passing to block 820 in FIG. 8B via connector C. Block 820 depicts the highlighting of the window icon ring associated with the scroll bar tail. Then, the process returns to block 802 in FIG. 8A via connector F.

Referring back to block 818, if the scroll bar event is not a selection of the scroll bar tail, the process then proceeds to block 822. Block 822 depicts a determination of whether or not the scroll bar event is a movement of the scroll bar tail. If the scroll bar event involves a movement of the scroll bar tail, the process proceeds to block 824 in FIG. 8B via connector D. Block 824 illustrates the rotation of the scroll bar tail in accordance with movements of the mouse. Next, the process passes to block 826, which depicts the highlighting of the window icon selected by the scroll bar tail. Thereafter, the process proceeds to block 814, which illustrates bringing the window associated with the window icon to foreground. Afterward, the process proceeds to block 816. Block 816 depicts the linking of the window's scroll bar to the rotatable scroll bar. Thereafter, the process returns to block 802 in FIG. 8A via connector F.

Referring again to block 822, if the scroll bar event is an event other than a movement of the scroll bar tail, the process than passes to block 828. Block 828 illustrates a determination of whether or not the slider has been moved. If the scroll bar event involves a movement of the slider, the process proceeds to block 830 in FIG. 8B via connector E. Block 830 depicts the execution of the function normally performed by the window's scroll bar that is linked to the rotatable scroll bar. Afterward, the process returns to block 802 in FIG. 8A via connector F. Referring back to block 828, if the scroll bar event is not a movement of the slider, the process then returns to block 702.

Figure 9:
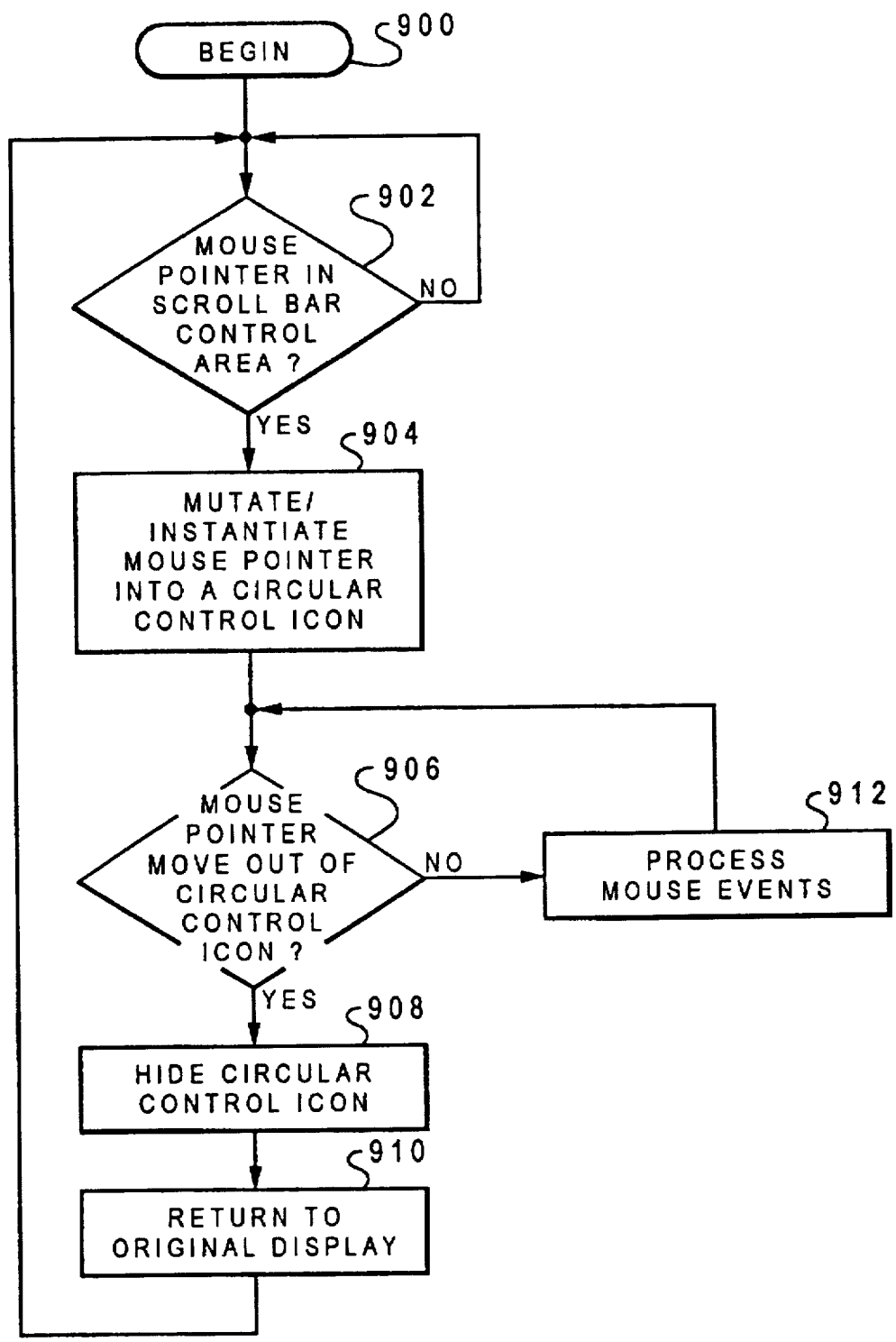
FIG. 9 depicts a high level logic flowchart illustrating a method and system for reducing the screen space required to implement a control icon having rotatable scroll bar in accordance with a preferred embodiment of the present invention.

With reference now to FIG. 9, a high level logic flowchart illustrating a method and system for reducing the screen space required to implement a circular control icon having a rotatable scroll bar in accordance with a preferred embodiment of the present invention is depicted. As illustrated, the process begins in block 900 and thereafter proceeds to block 902, which depicts a determination of whether or not the mouse pointer is in the scroll bar control area. A scroll bar control area is a portion of the screen that graphically indicates to a user that a circular control icon is available if the mouse pointer is moved into the control area. The scroll bar control area may be, for example, an icon or a color indicator. The scroll bar control area need not be any larger than the minimum selectable area of a mouse pointer. If the mouse pointer is in the scroll bar control area, the process then passes to block 904. Block 904 illustrates an instantiation or display of a circular control icon to the user. Afterward, the process proceeds to block 906, which depicts a determination of whether or not the mouse pointer has moved out of the circular control icon. Upon movement of the mouse pointer out of the circular control icon, the process then proceeds to block 908, which illustrates the hiding of the circular control icon. Next, the process proceeds to block 910, which depicts returning the display to its original format or display. Thereafter the process returns to block 902.

Referring back to block 906, if the mouse pointer remains in the scroll bar area, the process then proceeds to block 912. Block 912 illustrates processing mouse events in accordance with a preferred embodiment of the present invention. The mouse events include those scroll bar events and processes as described above. Thereafter, the process returns to block 906.

In accordance with a preferred embodiment of the present invention, the rotating scroll bar may be utilized as an extension of the mouse pointer, wherein the user interface may be a series of areas that represent a grouping of selected functions. Consequently, when the user moves the mouse pointer into a selected area (scroll bar control area), that area would mutate or change into the appropriate type of scroll bar, such as a rotating scroll bar of the present invention. When the mouse pointer is moved out of the rotating scroll bar, the active scroll bar would mutate or return to its hidden state. Thus, a large number of functions may be accessed in a much smaller area of the screen.

The present invention allows for selection and use of multiple functions with a single scroll bar and slider. Additionally another advantage of the present invention is multiple windows may be controlled from a single scroll bar. Consequently, a user may browse and manipulate multiple documents very quickly utilizing a single scroll bar.

Figure 10B:
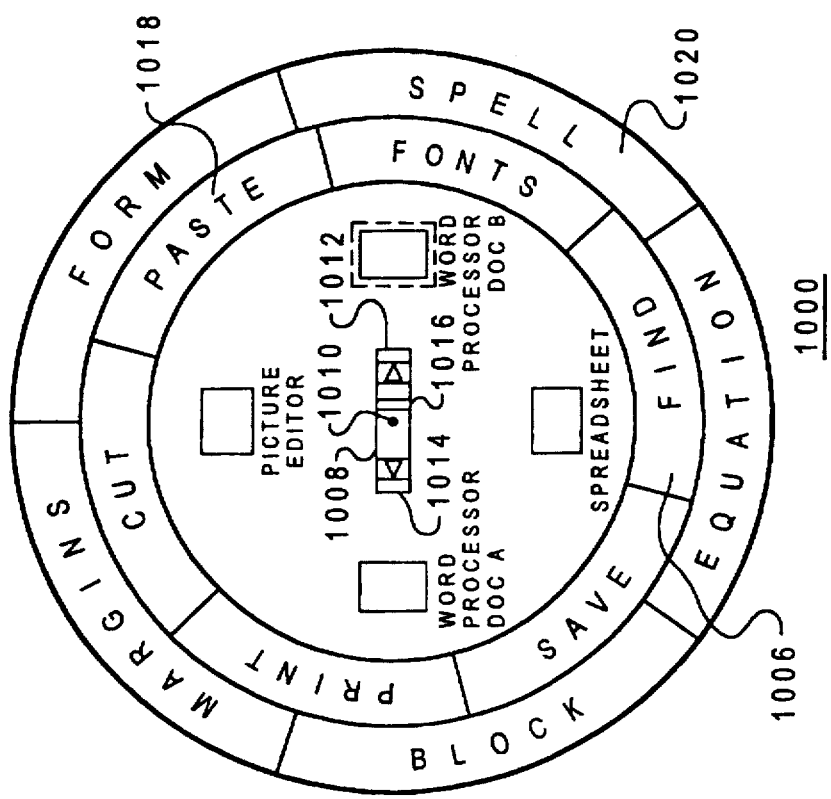
FIGS. 10A and 10B are pictorial representations illustrating a rotatable scroll bar located within an icon ring and two command rings are depicted in accordance with a preferred embodiment of the present invention.
Figure 10A:
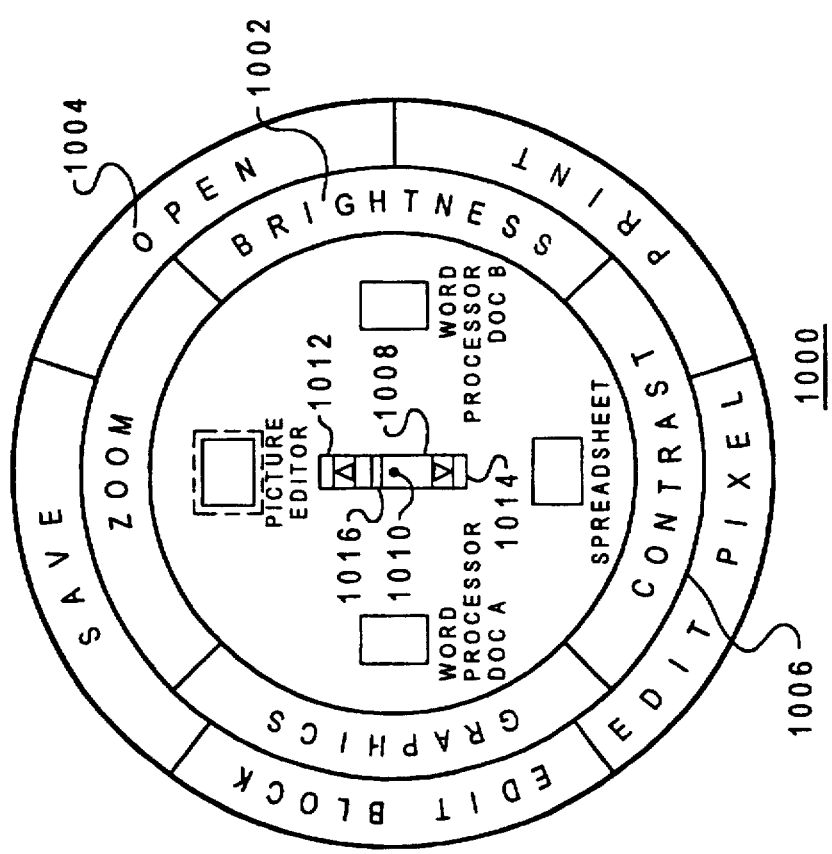

Referring next to FIGS. 10A and 10B, pictorial representations illustrating a rotatable scroll bar located within an icon ring and two command rings are depicted in accordance with a preferred embodiment of the present invention. Referring first to FIG. 10A, a circular control icon 1000 is displayed. Circular control icon 1000 includes command rings 1002 and 1004. Inside of command ring 1002, is icon ring 1006. This circular control icon may be employed to select various functions and windows within display screen 300 in FIG. 3 in accordance with a preferred embodiment of the present invention. Although circular control icon 1000 is a circle in the depicted embodiment, it is contemplated that any substantially circular shape may be employed within a preferred embodiment of the present invention.

As illustrated in FIG. 10A, rotatable scroll bar 1008 is located within circular control icon 1000 and is rotatable about pivot point 1010. Rotatable scroll bar 1008 preferable includes a head 1012 and a tail 1014. Either head 1012 or tail 1014 may be selected by a user with a mouse to rotate rotatable scroll bar 1008 about pivot point 1010.

In the depicted example, command rings 1002 and 1004 contain functions for a PICTURE EDITOR within icon ring 1006. Functions within command rings 1002 and 1004 may be selected by a user manipulating rotatable scroll bar 1008 utilizing a mouse. In accordance with a preferred embodiment of the present invention, head 1012 is associated with command ring 1002 and scroll bar tail 1014 is associated with command ring 1004. A function, such as, for example, "SAVE", may be selected by a user when scroll bar tail 1014 is selected and rotated such that tail 1014 points to the section or portion of command ring 1004 labeled "SAVE". Functions within command ring 1002 may be chosen when a user selects scroll bar head 1012 and rotate it to point to a desired function. Slider 1016 is employed control the selected function in accordance with a preferred embodiment of the present invention.

Icon ring 1006 includes four icons: "PICTURE EDITOR", "WORD PROCESSOR DOC B", "SPREADSHEET", and "WORD PROCESSOR DOC A" in the depicted example. PICTURE EDITOR is the currently selected icon with icon ring 1006. The functions within command rings 1002 and 1004 are functions associated with PICTURE EDITOR in icon ring 1006. Selection of a different icon within icon ring 1006 would result in a new set of command rings being displayed to the user. These new command rings would contain functions associated with the program or application selected by the user via icon ring 1006.

Alternatively, if a single command ring is employed, the functions in the command ring may be selected using scroll bar head 1012 and an icon from within icon ring 1006 may be selected using scroll bar tail 1014 in accordance with a preferred embodiment of the present invention.

With reference to FIG. 10B, the user has selected WORD PROCESSOR DOC B from icon ring 1006. As a result, circular control icon 1000 now displays command rings 1018 and 1020 to the user. These command rings contain functions associated with WORD PROCESSOR DOC B in accordance with a preferred embodiment of the present invention. As a result, a user may select various applications executing within windows by employing icon ring 1006.

A selection of an icon within icon ring 1006 brings the window containing the application associated with the icon to the foreground. The selection may be accomplished using a pointer to directly select an icon from icon ring 1006. Alternatively, the rotatable scroll bar may be employed to select icons from icon ring 1006 in accordance with a preferred embodiment of the present invention. If the application is not currently executing, the application is launched or started in accordance with a preferred embodiment of the present invention. In this manner, a number of windows and functions may be manipulated by a user with a minimal use of mouse movement in accordance with a preferred embodiment of the present invention.

Figure 11A:
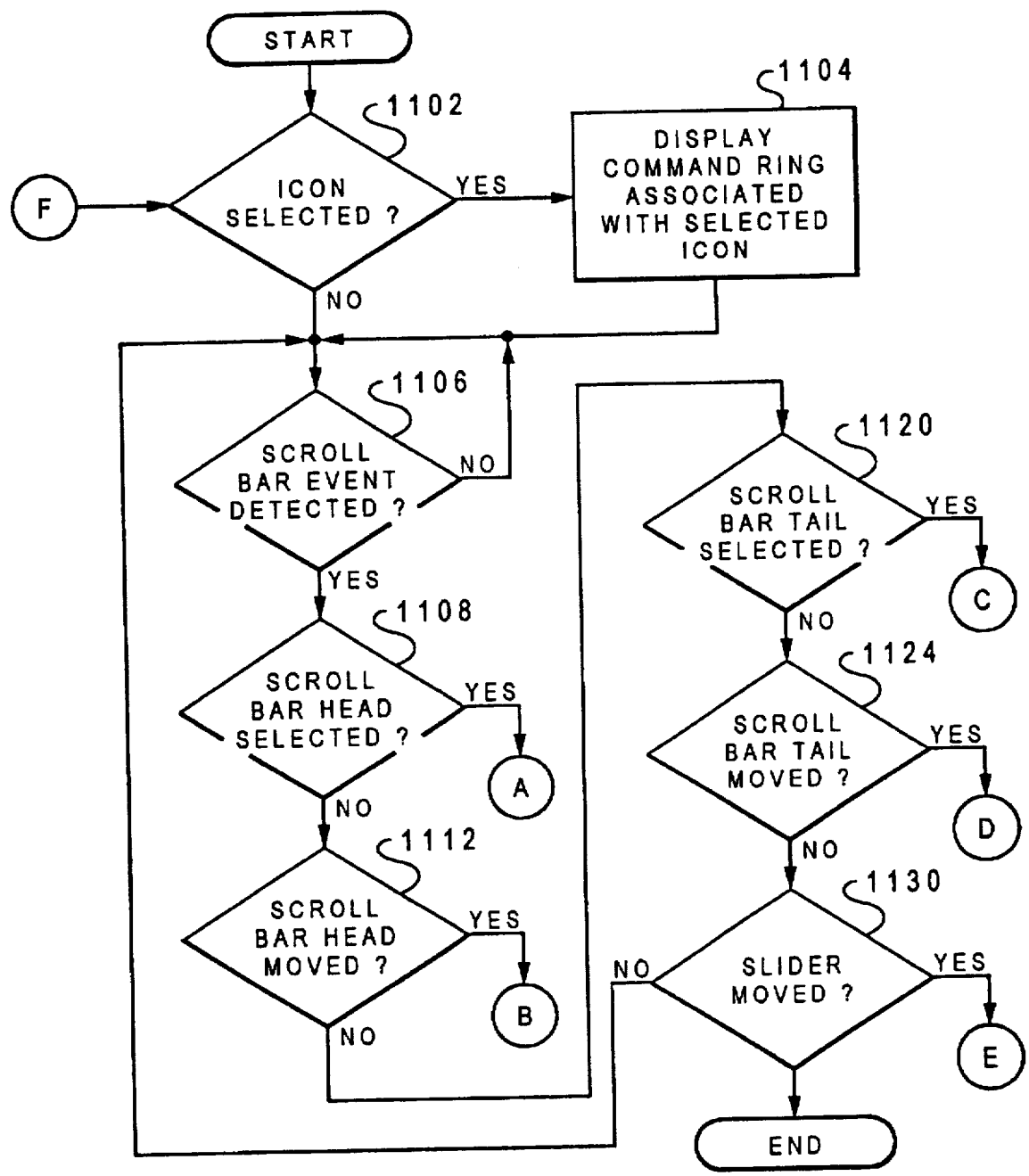
FIGS. 11A and 11B are a high level logic flowchart illustrating a method and system for selecting multiple functions located on two command rings associated with an icon ring using a rotatable scroll bar located within the command ring is depicted in accordance with a preferred embodiment of the present invention.
Figure 11B:
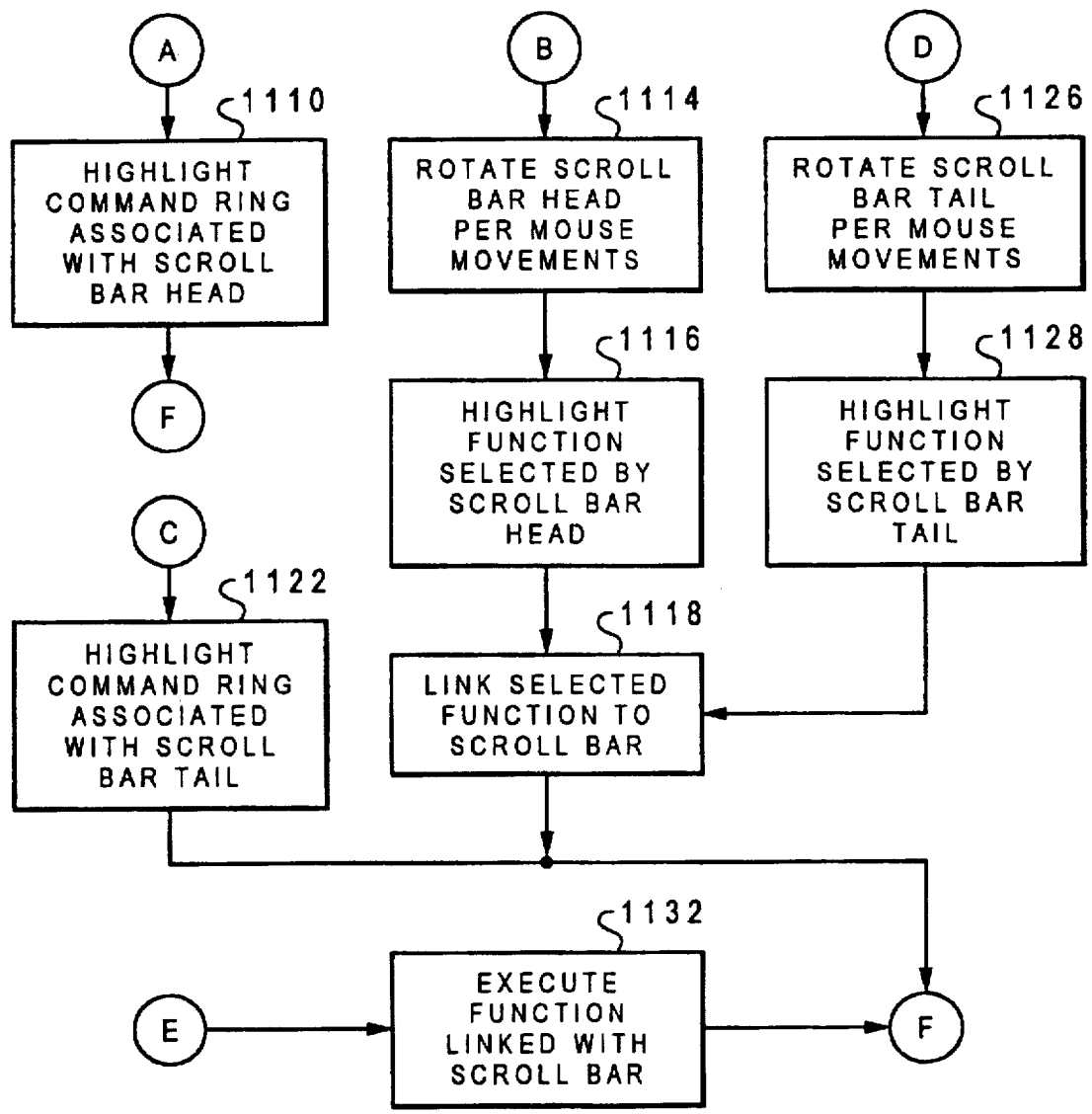

With reference now to FIGS. 11A and 11B, a high level logic flowchart illustrating a method and system for selecting multiple functions located on two command rings associated with an icon ring using a rotatable scroll bar is depicted in accordance with a preferred embodiment of the present invention. The process begins in block 1100 in FIG. 10A and thereafter passes to block 1102. Block 1102 depicts a determination of whether or not an icon from the icon ring was selected. If an icon has been selected, the process then proceeds to block 1104, which illustrates a display of the command rings associated with the selected icon. The functions within the command rings are functions employed in the application associated with the selected icon. Thereafter, the process proceeds to block 1106. The process also passes to block 1106 if an icon from the icon ring has not been selected. Block 1106 depicts a determination of whether or not a scroll bar event has been detected. If a scroll bar event has not been detected the process returns to block 1102. A scroll bar event may include various events such as a selection of the scroll bar tail or the scroll bar head, movement or rotation or the rotatable scroll bar, or movement of the slider within the rotatable scroll bar.

After detecting a scroll bar event in block 1106, the process then proceeds to block 1108, which illustrates a determination of whether or not the scroll bar head has been selected. Upon a selection of the scroll bar head, the process proceeds to block 1110 in FIG. 10B via connector A. Block 1110 depicts the highlighting of a command ring associated with the scroll bar head. The command ring contains a number of selections representing various functions that may be selected by a user in accordance with a preferred embodiment of the present invention. Thereafter, the process returns to block 1102.

Referring back to block 1108, if the scroll bar head has not been selected, the process passes to block 1112, which depicts a determination of whether or not the scroll bar head has been moved. Movement of the scroll bar head is a scroll bar event that may occur only after the scroll bar head has been selected. If the scroll bar head has been moved, the process then passes to block 1114 in FIG. 11B via connector B. Block 1114 illustrates rotation of the entire scroll bar in accordance with the movements of the mouse. Afterward, the process advances to block 1116, which depicts the highlighting of the function selected by the scroll bar head. Next, the process passes to block 1118. Block 1118 illustrates the linking of the selected function to the scroll bar. Thereafter, the process returns to block 1102 in FIG. 11A via connector F to monitor for the occurrence of more scroll bar events.

Referring again to block 1112, if the scroll bar event is not a movement of the scroll bar head, the process then advances to block 1120, which illustrates a determination of whether or not the scroll bar tail has been selected. Selection of the scroll bar tail results in the process passing to block 1122 in FIG. 11B via connector C. Block 1122 depicts the highlighting of a command ring associated with the scroll bar tail. The process then returns to block 1102 in FIG. 11A via connector F.

Referring back to block 1120, if the scroll bar event is not a selection of the scroll bar tail, the process then advance to block 1124. Block 1124 depicts the determination of whether or not the scroll bar event is a movement of the scroll bar tail. This particular scroll bar event may occur only after a scroll bar tail has been selected by the user. Movement of the scroll bar tail results in the process proceeding to block 1128 in FIG. 11B via connector D. Block 1128 illustrates the rotation of the entire scroll bar including the scroll bar tail, in accordance with the movements of the mouse. Afterward, the process passes to block 1128 which illustrates the highlighting of functions selected by the scroll bar tail. Thereafter, the process proceeds to block 1118. Block 1118 illustrates the linking of the selected function to the scroll bar. The process then returns block 1102 in FIG. 11A via connector F.

Referring back to block 1124, if the scroll bar event does not involve a movement of the scroll bar tail, the process then proceeds to block 1130, which illustrates a determination of whether or not the scroll bar event involves movement of the slider. Movement of the slider results in the process proceeding to block 1132 in FIG. 11B via connector E. Block 1132 depicts the execution of the function currently linked with the scroll bar. Afterward, the process returns to block 1102 in FIG. 11A via connector F. Referring back to block 1130, if the scroll bar event does not include movement of the slider, the process simply returns to block 1102 in accordance with a preferred embodiment of the present invention.

Figure 12A:
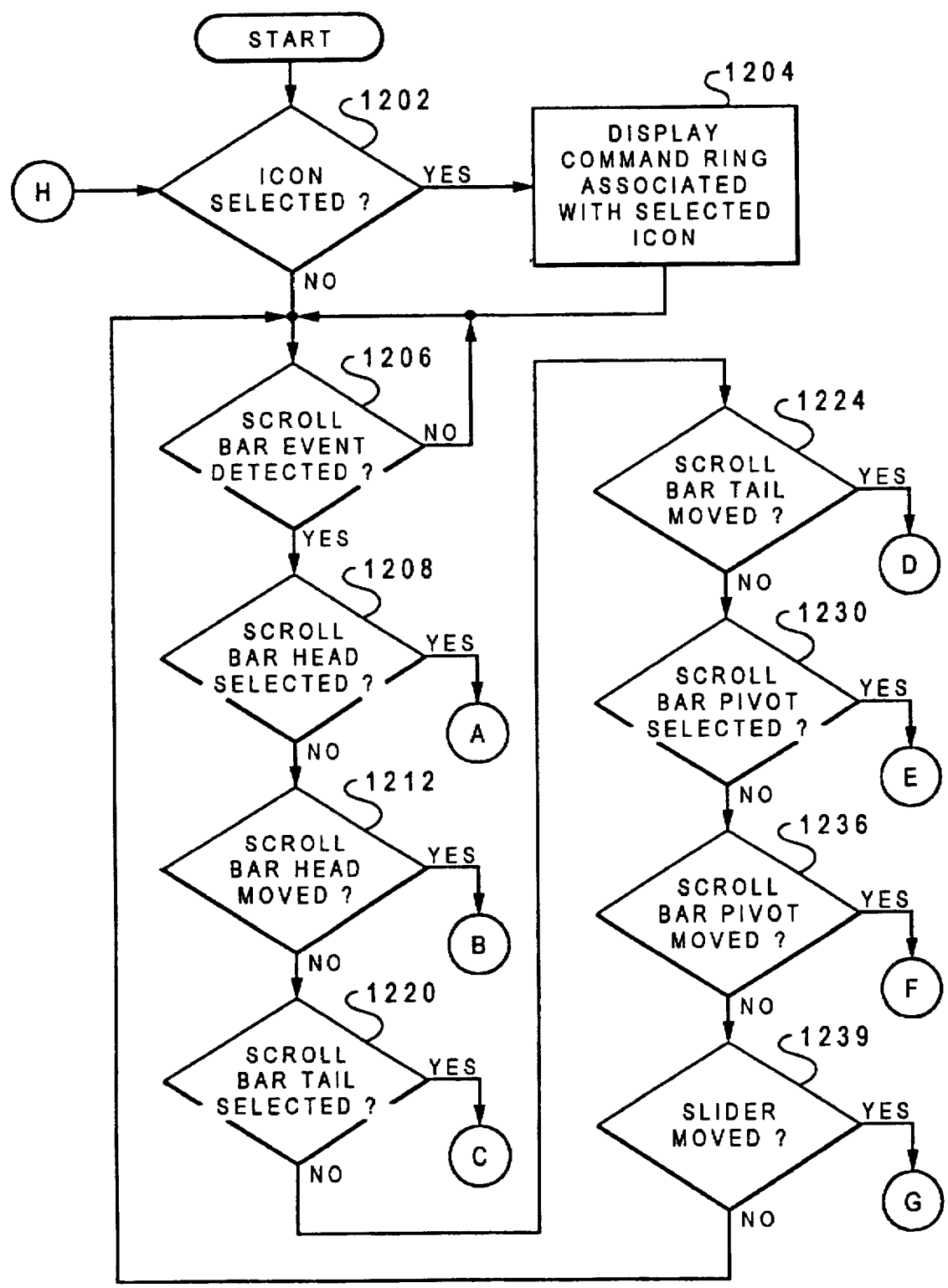
FIGS. 12A, 12B, and 12C, a high level logic flowchart illustrating a method and system for selecting multiple functions with a control icon having a rotatable scroll bar that may be moved to a number of different command rings is depicted in accordance with a preferred embodiment of the present invention.
Figure 12B:
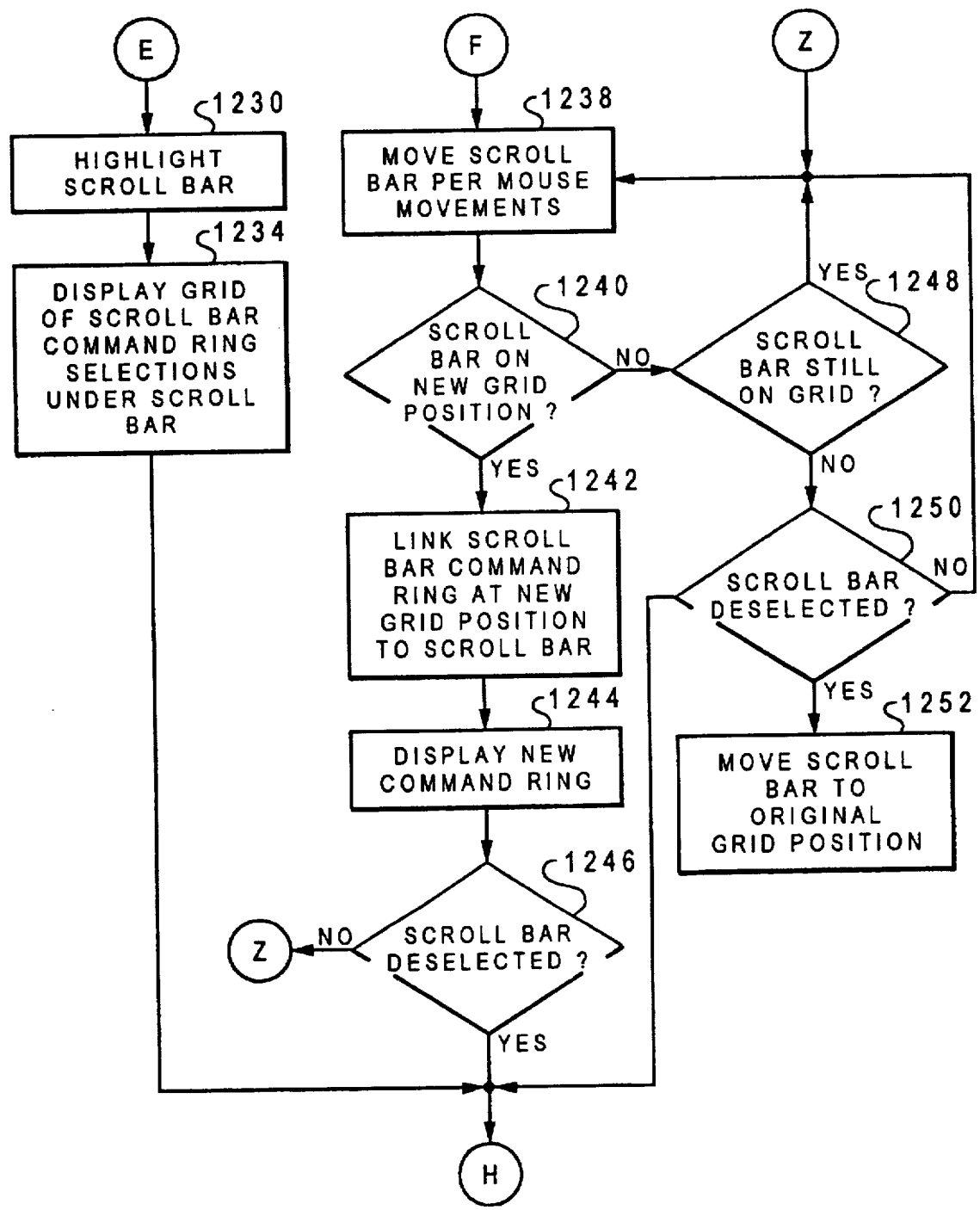
Figure 12C:
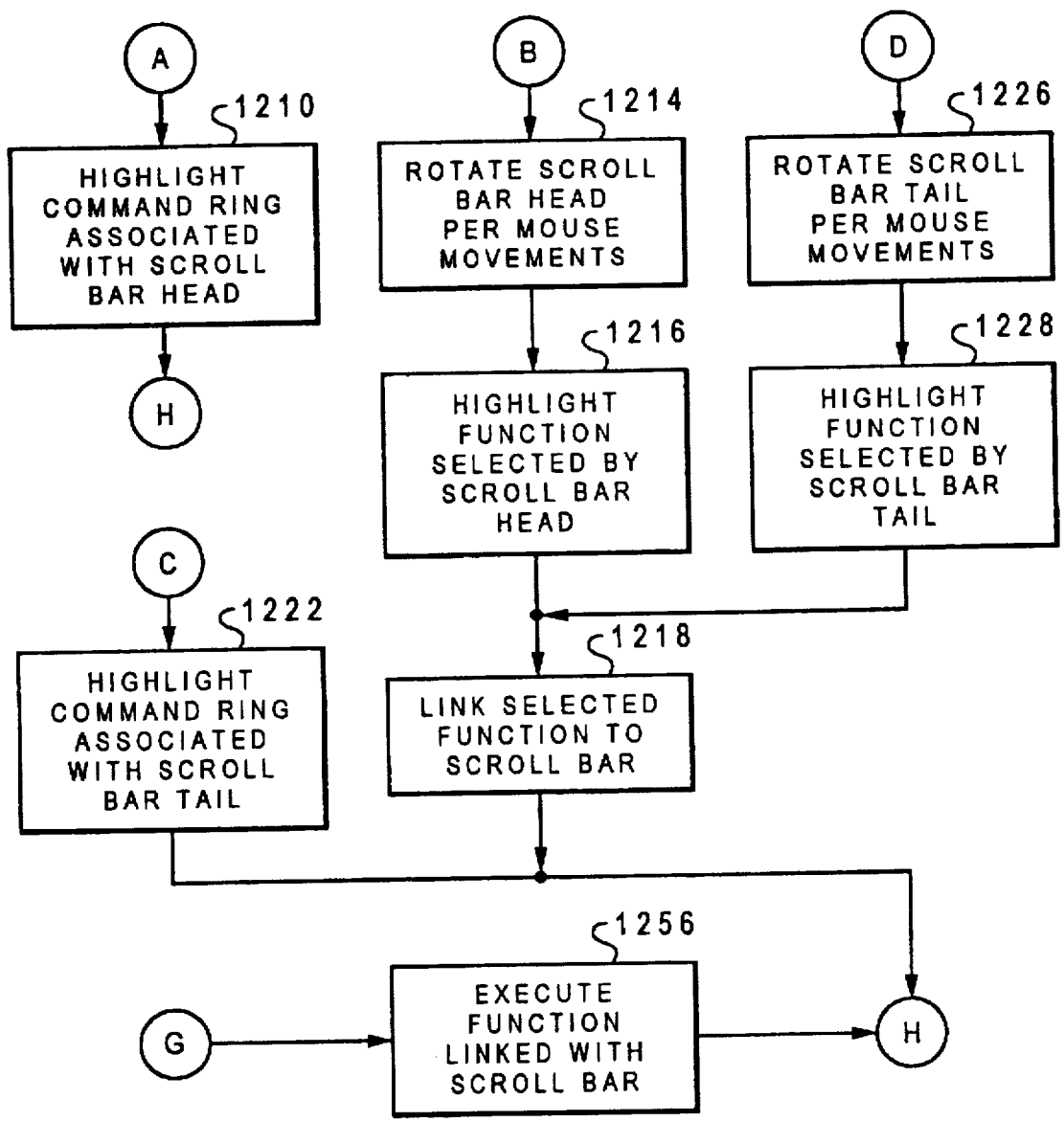

Referring now to FIGS. 12A, 12B, and 12C, a high level logic flowchart illustrating a method and system for selecting multiple functions with a control icon having a rotatable scroll bar that may be moved to a number of different command rings is depicted in accordance with a preferred embodiment of the present invention. With reference to FIG. 12A, the process begins in block 1200 and thereafter proceeds to block 1202. Block 1202 depicts a determination of whether an icon from the icon ring has been selected. A selection of an icon from the icon ring results in the process advancing to block 1204, which depicts a display of command rings associated with the selected icon. Thereafter, the process passes to block 1206. The process also passes to block 1206 from block 1202 if an icon has not been selected from the icon ring. Block 1206 depicts a determination of whether or not a scroll bar event has been detected. Upon a detection of a scroll bar event, the process proceeds to block 1208, which illustrates a determination of whether or not the scroll bar event is a selection of the scroll bar head. Selection of the scroll bar head results in the process passing to block 1210 in FIG. 12B via connector A. Block 1210 depicts the highlighting of the command ring associated with the scroll bar head. The process then returns to block 1202 in FIG. 12A via connector H.

Referring back to block 1208, if the scroll bar is not a selection of the scroll bar head, the process then advances to block 1212, which depicts a determination of whether or not the scroll bar event is a movement of the scroll bar head. Movement of the scroll bar head causes the process to advance to block 1214 in FIG. 12B via connector B. Block 1214 illustrates the rotation of the scroll bar head in accordance with the movements of the mouse. The process then advances to block 1216, which illustrates the highlighting of the functions selected by the scroll bar head. Next, the process advances to block 1218. Block 1218 illustrates the linking of the selected function to the scroll bar. Thereafter, the process returns to block 1202 in FIG. 12A via connector H.

Referring back to block 1212, if the scroll bar event is not a movement of the scroll bar head, the process then passes to block 1220. Block 1220 illustrates a determination of whether or not the scroll bar tail has been selected. Upon a selection of the scroll bar tail, the process proceeds to block 1222 in FIG. 12B via connector C. Block 1222 depicts the highlighting of the command ring associated with the scroll bar tail. Afterward, the process returns to block 1202 in FIG. 12A via connector H.

Referring back to block 1220, if the scroll bar event is not a selection of the scroll bar tail, the process then proceeds to block 1224. Block 1224 depicts a determination of whether or not the scroll bar tail has been moved. Movement of the scroll bar tail results in the process proceeding to block 1226 in FIG. 12B via connector D. Block 1226 illustrates the rotation of the scroll bar tail in accordance with mouse movements. Afterward, the process then advances to block 1228. Block 1228 depicts the highlighting of the function selected by the scroll bar tail. Thereafter, the process advances to block 1218, which illustrates the linking of the selected function with the scroll bar. Afterward, the process returns to block 1202 in FIG. 12A via connector H.

Referring back to block 1224, if the scroll bar event is not a movement of the scroll bar tail, the process then proceeds to block 1230, which illustrates a determination of whether or not the scroll bar pivot has been selected. A selection of the scroll bar pivot causes the process to pass to block 1232 in FIG. 12C via connector E. Block 1232 depicts the highlighting of the scroll bar. Next, the process advances to block 1234, which illustrates the display of a grid containing scroll bar command ring selections under the scroll bar in accordance with a preferred embodiment of the present invention. The process then returns to block 1202 in FIG. 12A via connector H.

Referring back to block 1230, if the scroll bar event was not a selection of the scroll bar pivot, the process then advances to block 1236. Block 1236 depicts a determination of whether or not the scroll bar event is a movement of the scroll bar pivot. Movement of the scroll bar pivot may occur only after the scroll bar pivot has been selected by the user. A scroll bar event involving movement of the scroll bar pivot causes the process to pass to block 1238 in FIG. 12C via connector F. Movement of the scroll bar pivot results with the entire scroll bar being moved in accordance with mouse movement as illustrated in block 1238.

Next, the process proceeds to block 1240, which depicts a determination of whether or not the scroll bar is located on a new grid position. If the scroll bar is located on a new grid position, the process then proceeds to block 1242, which illustrates linking the scroll bar to the icon ring and associated command rings at the new grid position with the scroll bar. Next, the process proceeds to block 1244, which depicts the displaying of the new icon ring and command ring with the scroll bar. The process then passes to block 1246. Block 1246 illustrates a determination of whether or not the scroll bar has been deselected. If the scroll bar has been deselected, the process returns to block 1202 in FIG. 12A via connector H. On the other hand, if the scroll bar has not been deselected, the process returns to block 1238 via connector Z.

Referring back to block 1240, if the scroll bar has not been moved to a new grid position, the process then passes to block 1248, which illustrates a determination of whether or not the scroll bar is still on the grid. If the scroll bar is still on the grid, the process returns to block 1238. When the scroll bar is off the grid, the process advances to block 1250, which illustrates a determination of whether or not the scroll bar has been deselected. If the scroll bar has not been deselected. The process returns to block 1238. Otherwise, the scroll bar proceeds to block 1252, which depicts the moving of the scroll bar back to the original grid position in accordance with a preferred embodiment of the present invention. Those skilled in the art will realize that various events may occur other than returning the scroll bar back to the original grid upon deselection of the scroll bar. For example, the scroll bar may be moved to the nearest grid, instead back to the original grid. Afterward, the process returns to block 1202 in the FIG. 12A via connector H.

Referring back to block 1236 in FIG. 12A, if the scroll bar event is not a movement of the scroll bar pivot, the process then proceeds to block 1254. Block 1254 illustrates a determination of whether or not the slider on the scroll bar has been moved. Movement of the slider results in the process advancing to block 1256 in FIG. 12B via connector G. Block 1256 depicts the execution of the function linked with the scroll bar tail. Afterward, the process returns to block 1202 in FIG. 12A via connector H. Referring back to block 1254, if the scroll bar event is not a selection of the slider, the process then returns to block 1202.

Figure 13A:
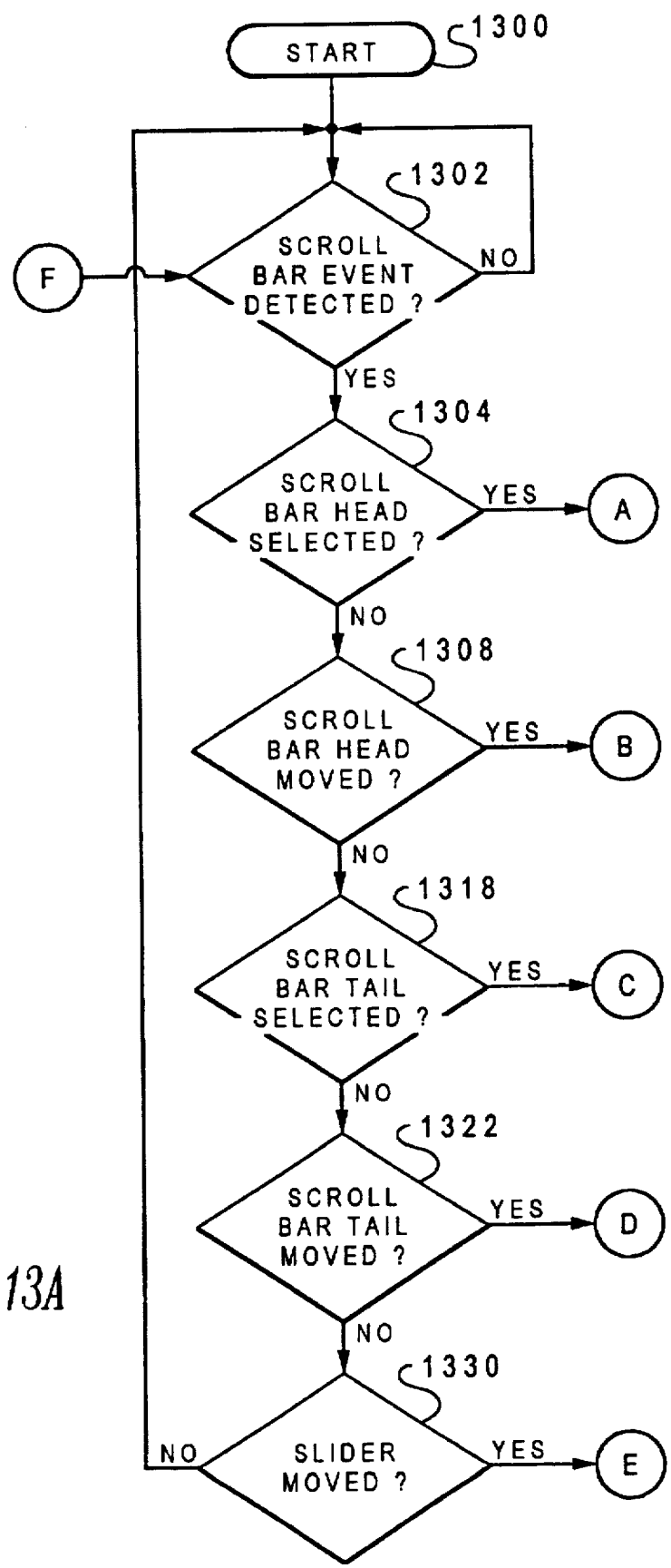
FIGS. 13A and 13B are a high level logic flowchart illustrating a method and system for manipulating a number of windows utilizing a control icon having a rotatable scroll bar is depicted in accordance with a preferred embodiment of the present invention.
Figure 13B:
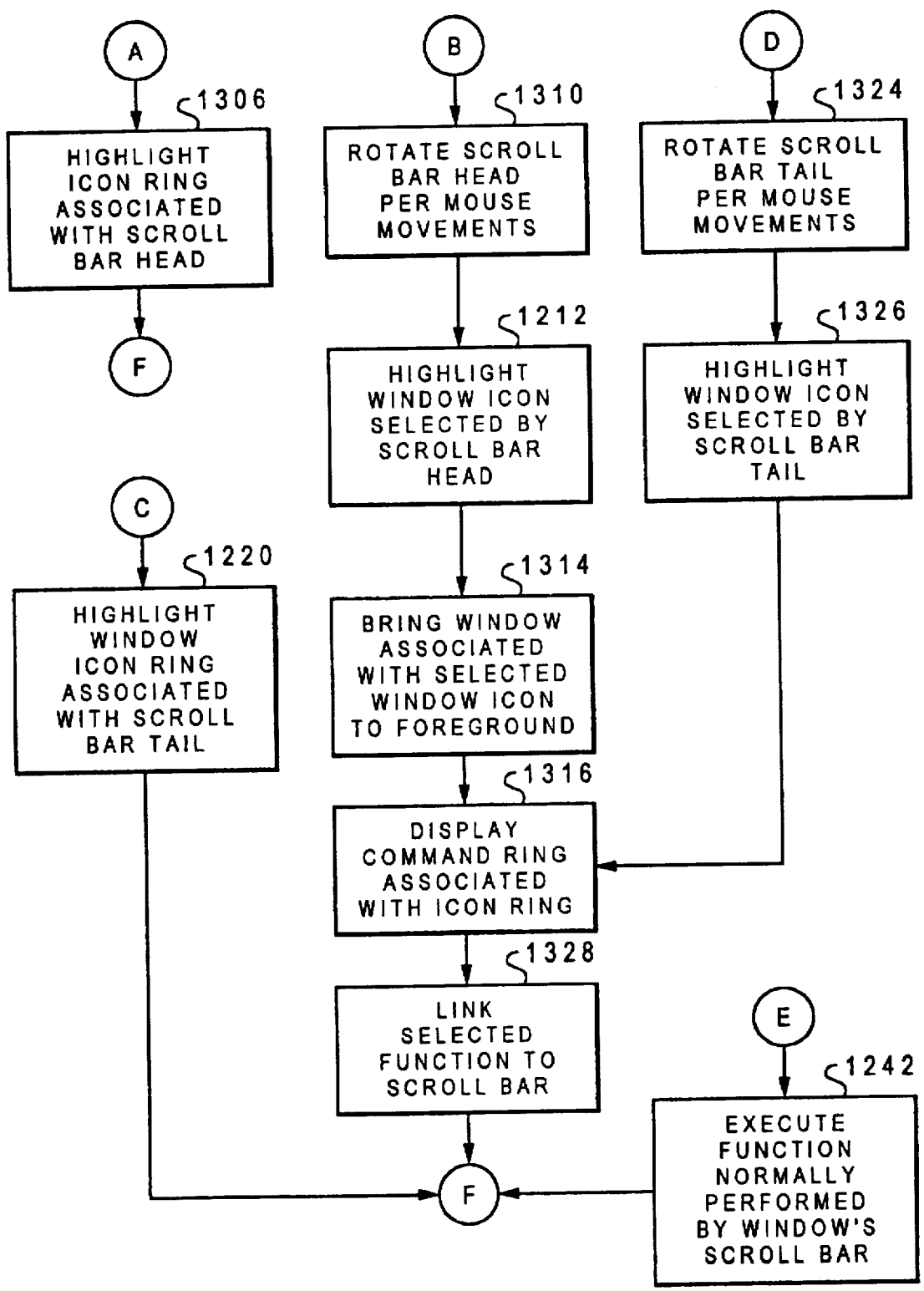

With reference now to FIGS. 13A and 13B, a high level logic flowchart illustrating a method and system for manipulating a number of windows utilizing a control icon having a rotatable scroll bar within a command ring and an icon ring is depicted in accordance with a preferred embodiment of the present invention. The process begins in block 1302, which depicts a determination of whether or not a scroll bar event has been detected.

Upon a detection of a scroll bar event, the process then advances to block 1304, which illustrates a determination of whether or not the scroll bar event involves a selection of the scroll bar head. A selection of the scroll bar head results in the process passing to block 1306 in FIG. 13B via connector A. Block 1306 depicts the highlighting of the window icon ring associated with the scroll bar head. Thereafter, the process returns to block 1302 in FIG. 13A via connector F.

Referring again to block 1304, if the scroll bar event is an event other than a selection of the scroll bar head, the process then advances to block 1308. Block 1308 depicts a determination of whether or not the scroll bar event consist of a movement of the scroll bar head. If the scroll bar event is a movement of the scroll bar head, the process then passes to block 1310 in FIG. 13B via connector B. Block 1310 illustrates the rotation of the scroll bar head in accordance with the movements of the mouse. Thereafter, process advances to block 1312, which depicts the highlighting of the window icon selected by the scroll bar head. Afterward, the process proceeds to block 1314, which illustrates bringing the window associated with the selected icon to the foreground. The process then passes to block 1316, which illustrates displaying the command selected ring associated with the icon. Afterward, the process returns to block 1302 in FIG. 13A via connector F.

Referring again to block 1308, in the event that the scroll bar event is not a movement of the scroll bar head the process then advances proceeds to block 1318, which illustrates a determination of whether or not the scroll bar tail has been selected. A scroll bar event involving the selection of the scroll bar tail results in the process proceeding to block 1320 in FIG. 13B via connector C. Block 1320 depicts the highlighting of the window icon ring associated with the scroll bar tail. Then, the process returns to block 1302 in FIG. 13A via connector F.

Referring back to block 1318, if the scroll bar event is not a selection of the scroll bar tail, the process then advances to block 1322. Block 1322 depicts a determination of whether or not the scroll bar event is a movement of the scroll bar tail. This scroll bar event may occur only if the scroll bar tail has been selected. If the scroll bar event involves a movement of the scroll bar tail, the process then proceeds to block 1324 in FIG. 13B via connector D. Block 1324 illustrates rotating the scroll bar according to the mouse movements. The process then advances block 1326, which depicts highlighting the function selected by the scroll bar tail. Thereafter, the process proceeds to block 1328. Block 1328 depicts linking the selected function to the scroll bar. The process then returns to block 1302 via connector F.

With reference again to block 1322, if the scroll bar event is not a movement of the scroll bar tail, the process then proceeds to block 1330, which depicts a determination of whether or not the scroll bar event involves a movement of the slider in the scroll bar. A movement of the slider in the scroll bar results in the process passing to block 1332 in FIG. 13B via connector E. Block 1332 illustrates executing the function linked with the scroll bar. Thereafter, the process returns to block 1302 via connector F.

The process is depicted in FIGS. 5A–9 and 11A–13B may be implemented by those of ordinary skill in the art within the system depicted in FIGS. 1 and 2. The processes of the present invention also may be implemented in a program storage device that is readable by a data processing system, wherein the program storage device encodes data processing system executable instruction coding for the processes of the present invention. The program storage device may take various forms including, for example, but not limited to a hard disk drive, a floppy disk, a optimal disk, and ROM, a RAM, and an EPROM, which are known to those skilled in the art. The process is stored on the program storage device are dormant until activated by using the program storage device with the data processing system. For example, a hard drive containing data processing system executable instructions for the present invention may be connected to a data processing system. A floppy disk containing data processing system executable instructions for the present invention may be inserted into a floppy disk drive in the data processing system.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for efficiently managing a plurality of displayable objects within a display, the method comprising the data processing system implemented steps of:

displaying a first plurality of graphic selections arranged in a substantially circular formation, each of the first plurality of graphic selections being associated with one of the plurality of displayable objects;

displaying a rotatable pointer within the substantially circular formation, the rotatable pointer including a movable control element located within the rotatable pointer;

displaying a second plurality of graphic selections arranged in a substantially circular formation in response to a selection of a graphic selection from the first plurality of graphic selections; and altering a display of a displayable object associated with the selected graphic selection in response to a selection of one of the second plurality of graphic selections utilizing the rotatable pointer and the movable control element, wherein the rotatable pointer and the movable control element are manipulated by a user controlled pointer.

2. The method of claim 1, further comprising displaying the displayable object associated with the selected graphical selection in a foreground mode.

3. The method of claim 1, wherein the step of displaying a second plurality of graphic selections comprises displaying a second plurality of graphic selections arranged in a substantially circular formation within the first plurality of graphic selections in response to a selection of a graphic selection from the first plurality of graphic selections.

4. The method of claim 1, wherein the step of displaying a second plurality of graphic selection comprises displaying a second plurality of graphic selections arranged in a substantially circular formation around the first plurality of graphic selections in response to a selection of a graphic selection from the first plurality of graphic selections.

5. A data processing system for efficiently managing a plurality of displayable objects within a display, the method comprising the data processing system comprising:

first display means for displaying a first plurality of graphic selections arranged in a substantially circular formation, each of the first plurality of graphic selections being associated with one of the plurality of displayable objects;

second display means for displaying a rotatable pointer within the substantially circular formation, the rotatable pointer including a movable control element located within the rotatable pointer;

third display means for displaying a second plurality of graphic selections arranged in a substantially circular formation in response to a selection of a graphic selection from the first plurality of graphic selections; and alteration means for altering a display of a displayable object associated with the selected graphic selection in response to a selection of one of the second plurality of graphic selections utilizing the rotatable pointer and the movable control element, wherein the rotatable pointer and the movable control element are manipulated by a user controlled pointer.

6. The method of claim 5, further comprising displaying the displayable object associated with the selected graphical selection in a foreground mode.

7. The method of claim 5, wherein the step of displaying a second plurality of graphic selections comprises displaying a second plurality of graphic selections arranged in a substantially circular formation within the first plurality of graphic selections in response to a selection of a graphic selection from the first plurality of graphic selections.

8. The method of claim 5, wherein the step of displaying a second plurality of graphic selection comprises displaying a second plurality of graphic selections arranged in a substantially circular formation around the first plurality of graphic selections in response to a selection of a graphic selection from the first plurality of graphic selections.

9. A method for selectively manipulating a display of a plurality of overlapping data collections which are displayed in multiple layers and in a simulated three-dimensional manner within a data processing system, the method comprising the data processing system implemented steps of:

displaying a substantially circular control icon having a first ring and a second ring;

displaying a rotatable pointer rotatable about a pivot point within the first and second rings;

associating each of the plurality of data collections with a portion of the first ring;

displaying the multiple layers of the overlapping data collections in a selected order;

altering the selected order of the display of the multiple layers of overlapping data collections in response to a selection of a portion of the first ring by the rotatable pointer; and altering the display of a selected one of the plurality of data collections in response to a selection of a portion of the second ring utilizing the rotatable pointer.

10. The method of claim 9, wherein the step of displaying a substantially circular control icon having a first ring and a second ring includes displaying a plurality of selections within the second ring.

11. The method of claim 9, wherein the step of altering the selected order includes displaying a selected one of the plurality of data collections in a foreground mode in response to a selection of a portion of the first ring by the rotatable pointer.

12. The method of claim 11, wherein the step of displaying a substantially circular control icon having a first ring and a second ring includes displaying a plurality of selections associated with the selected one of the plurality of data collections in response to a selection of the first portion of the first ring by the rotatable pointer.

13. A data processing system for selectively manipulating a display of a plurality of overlapping data collections which are displayed in multiple layers and in a simulated three-dimensional manner within a data processing system, the data processing system comprising:

first display means for displaying a substantially circular control icon having a first ring and a second ring;

second display means for displaying a rotatable pointer rotatable about a pivot point within the first and second rings;

association means for associating each of the plurality of data collections with a portion of the first ring;

third display means for displaying the multiple layers of the overlapping data collections in a selected order;

first alteration means for altering the selected order of the display of the multiple layers of overlapping data collections in response to a selection of a portion of the first ring by the rotatable pointer; and second alteration means for altering the display of a selected one of the plurality of data collections in response to a selection of a portion of the second ring utilizing the rotatable pointer.

14. A storage device readable by a data processing system and encoding data processing system executable instructions, the data storage device comprising:

means for displaying a substantially circular control icon having a first ring and a second ring;

means for displaying a rotatable pointer rotatable about a pivot pointer within the first and second rings;

means for associating each data collection in a plurality of data collections with a portion of the first ring;

means for displaying each data collection within the plurality of data collections in a selected order;

means for altering the selected order of the display of the plurality of data collections in response to a selection of a portion of the first ring by the rotatable pointer; and means for altering the display of one of the plurality of data collections in response to a selection of a portion of the second ring utilizing the rotatable pointer, wherein the means are activated when the storage device is connected to and accessed by a data processing system.

15. The storage device of claim 14, wherein the storage device is a hard disk drive.

16. The storage device of claim 14, wherein the storage device is a ROM for use with a data processing system.

17. The storage device of claim 14, wherein the storage device is a floppy diskette.

* * * * *